US012782743B2

(12) United States Patent
Ikeda et al.

(10) Patent No.: US 12,782,743 B2
(45) Date of Patent: Nov. 3, 2026

(54) HEAD-MOUNTED DISPLAY APPARATUS, OPTICAL MODULE, AND MANUFACTURING METHOD OF OPTICAL MODULE

(71) Applicant: SEIKO EPSON CORPORATION, Tokyo (JP)

(72) Inventors: Takuya Ikeda, Shiojiri (JP); Toshiyuki Noguchi, Shiojiri (JP); Toshiaki Miyao, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 257 days.

(21) Appl. No.: 18/621,034

(22) Filed: Mar. 28, 2024

(65) Prior Publication Data

US 2024/0329412 A1 Oct. 3, 2024

(30) Foreign Application Priority Data

Mar. 30, 2023 (JP) ................................ 2023-054841

(51) Int. Cl.
*G02B 27/01* (2006.01)
*G02B 27/09* (2006.01)
*G02B 27/18* (2006.01)

(52) U.S. Cl.
CPC ..... *G02B 27/0176* (2013.01); *G02B 27/0977* (2013.01); *G02B 27/18* (2013.01); *G02B 2027/0169* (2013.01); *G02B 2027/0178* (2013.01)

(58) Field of Classification Search
CPC ...................... G02B 27/0176; G02B 27/0977; G02B 27/18; G02B 27/0172; G02B 2027/0169; G02B 2027/0178
See application file for complete search history.

(56) References Cited

U.S. PATENT DOCUMENTS

2009/0168131 A1 7/2009 Yamaguchi et al.
2021/0063757 A1* 3/2021 Kamakura .............. G06F 3/011

FOREIGN PATENT DOCUMENTS

JP 2009157291 7/2009

* cited by examiner

*Primary Examiner* — Angela M. Medich
(74) *Attorney, Agent, or Firm* — JCIPRNET

(57) ABSTRACT

A head-mounted display apparatus includes an image forming element, a holder including a supporting member supporting the image forming element and a fixing member coupled to the supporting member, an optical member on which image light from the image forming element is incident, and a case configured to house the optical member and hold the image forming element therein via the holder, wherein the holder includes a transparent portion, the fixing member is fixed to an outside of the case by an adhesive material, and the adhesive material is interposed between the transparent portion and the case.

13 Claims, 18 Drawing Sheets

HEAD-MOUNTED DISPLAY APPARATUS, OPTICAL MODULE, AND MANUFACTURING METHOD OF OPTICAL MODULE

The present application is based on, and claims priority from JP Application Serial Number 2023-054841, filed Mar. 30, 2023, the disclosure of which is hereby incorporated by reference herein in its entirety.

BACKGROUND

1. Technical Field

The present disclosure relates to a head-mounted display apparatus and an optical module that enable observation of a virtual image, and a manufacturing method of the optical module.

2. Related Art

A head-mounted display apparatus has been known in which a unit that houses optical members such as an image forming element and a lens is covered with a housing, and packing is provided between a light-guiding member exposed outside and the housing, in order to ensure dust resistance and water resistance (JP 2009-157291 A).

In the apparatus of the related art described above, since the housing and an elastic encapsulation member such as the packing are required in order to house the optical members in the unit and further to obtain the dust resistance, the apparatus becomes large in order to obtain the dust resistance. Note that when an adhesive material is used instead of the packing, the adhesive material may enter an inside of the housing from between the housing and the light-guiding member. When a photo-curable type adhesive is used as the adhesive material, a portion to which light does not reach is uncured.

SUMMARY

A head-mounted display apparatus in an aspect of the present disclosure includes an image forming element, a holder including a supporting member supporting the image forming element and a fixing member coupled to the supporting member, an optical member on which image light from the image forming element is incident, and a case configured to house the optical member and hold the image forming element therein via the holder, wherein the holder includes a transparent portion, the fixing member is fixed to an outside of the case by an adhesive material, and the adhesive material is interposed between the transparent portion and the case.

An optical module in an aspect of the present disclosure includes an image forming element, a holder including a supporting member supporting the image forming element and a fixing member coupled to the supporting member, an optical member on which image light from the image forming element is incident, and a case configured to house the optical member and hold the image forming element therein via the holder, wherein the holder includes a transparent portion, the fixing member is fixed to an outside of the case by an adhesive material, and the adhesive material is interposed between the transparent portion and the case.

BRIEF DESCRIPTION OF THE DRAWINGS

FIG. 3 is a perspective view for explaining a support structure of a display section and the like.

FIG. 4 illustrates side cross-sectional views of a barrel, an optical member held by the barrel, and the like.

DESCRIPTION OF EMBODIMENTS

First Embodiment

A first embodiment of a head-mounted display apparatus according to the present disclosure will be described below with reference to FIGS. 1, 2 and the like.

Figure 1:
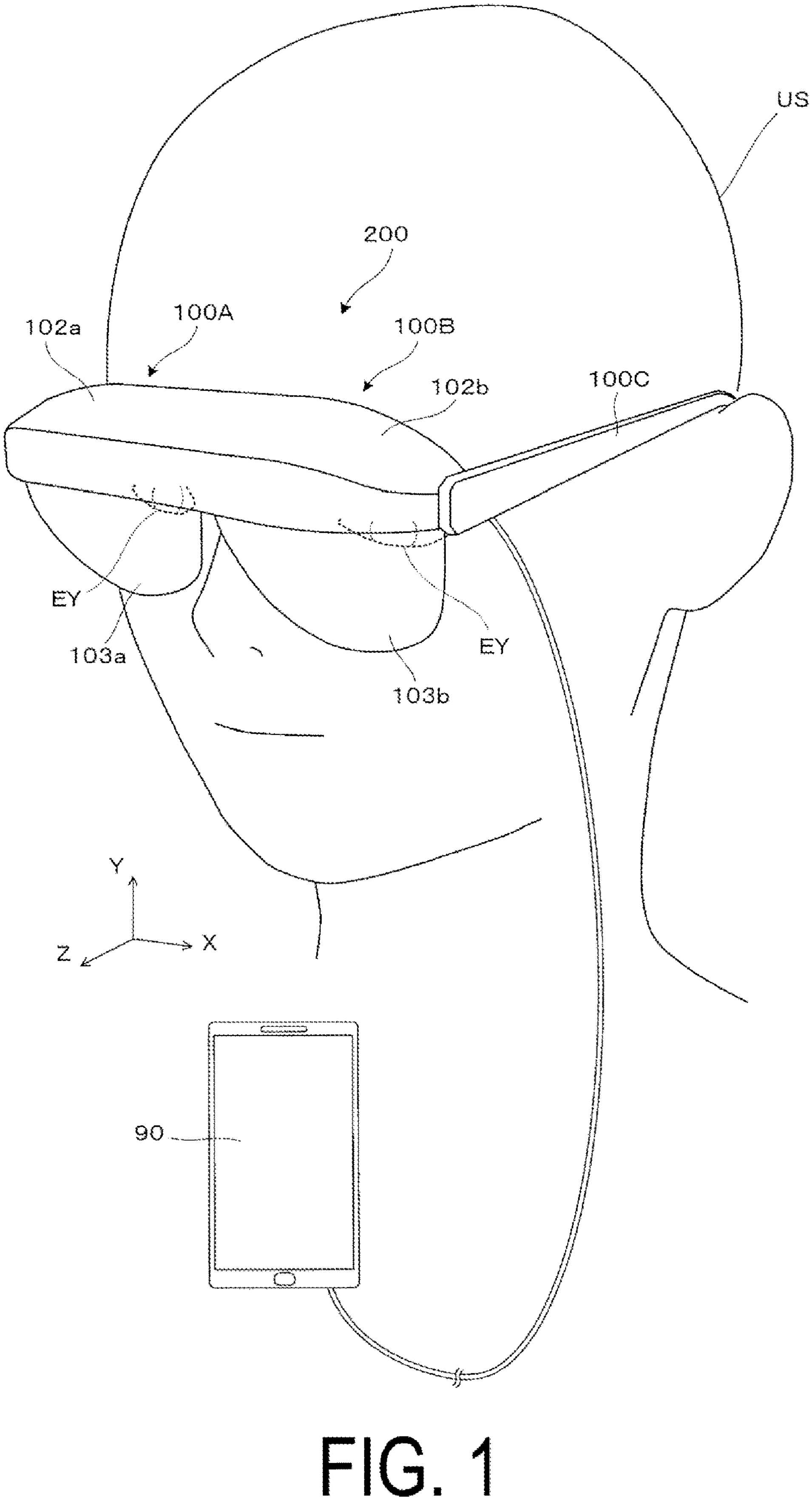
FIG. 1 is an external perspective view for explaining a usage state of a head-mounted display apparatus of a first embodiment.

FIG. 1 is a diagram for explaining a mounted state of a head-mounted display apparatus (hereinafter, also referred to as a head-mounted display or an "HMD") 200, and the HMD 200 allows an observer or wearer US who is wearing the HMD 200 to recognize an image as a virtual image. In FIG. 1 and the like, X, Y, and Z indicate an orthogonal coordinate system, a +X direction corresponds to a lateral direction in which both eyes EY of the observer or wearer US wearing the HMD 200 are aligned, a +Y direction corresponds to an upward direction orthogonal to the lateral direction in which both the eyes EY are aligned for the wearer US, and a +Z direction corresponds to a forward or front direction for the wearer US. The +Y directions are parallel to a vertical axis or a vertical direction.

The HMD 200 includes a right-eye first display device 100A, a left-eye second display device 100B, a pair of temple type support devices 100C that support the display devices 100A and 100B, and a user terminal 90 as an information terminal. The first display device 100A alone functions as an HMD, and includes a first display driving unit 102*a* arranged at an upper portion thereof, and a first combiner 103*a* that has a spectacle lens shape and covers a front of an eye. The second display device 100B alone functions as an HMD similarly, and includes a second display driving unit 102*b* arranged at an upper portion thereof, and a second combiner 103*b* that has a spectacle lens shape and covers a front of an eye. The support devices 100C are mounting members mounted on a head of the wearer US, and support upper end sides of the pair of combiners 103*a* and 103*b* via the display driving units 102*a* and 102*b* that are integrated in appearance. The first display device 100A and the second display device 100B are optically identical or left-right inverted, and detailed description of the second display device 100B will be omitted.

Figure 2:
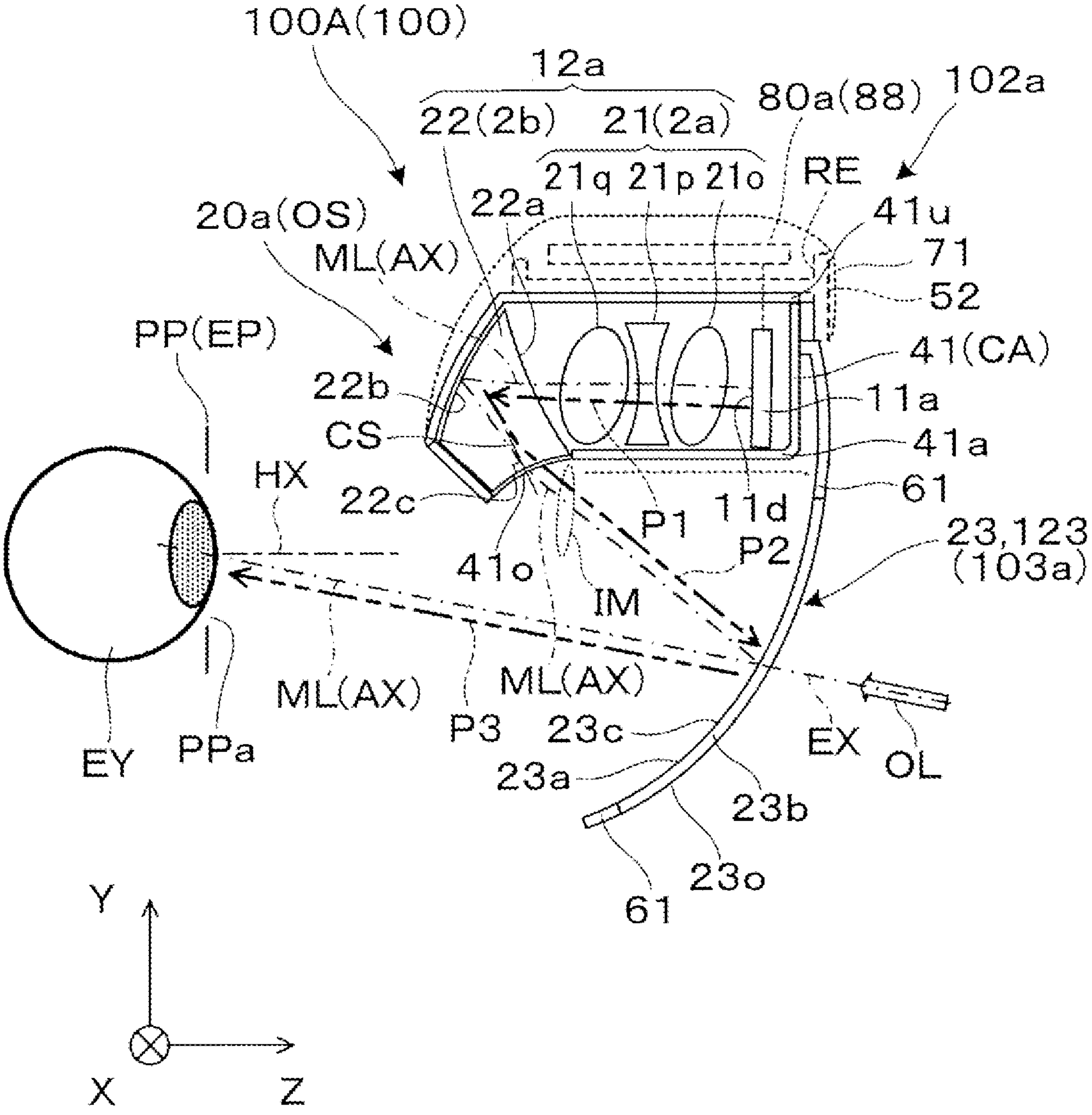
FIG. 2 is a side cross-sectional view for explaining an internal structure of a display device on one side.

FIG. 2 is a side cross-sectional view for explaining an internal structure of the first display device 100A. The first display device 100A includes a first image forming element 11*a*, a first display section 20*a*, and a driving circuit member 80*a*. The first image forming element 11*a* is also referred to as a video element. The first display section 20*a* is an imaging optical system that forms a virtual image and includes a projection lens 21, a prism mirror 22, and a see-through mirror 23. In the first display section 20*a*, the projection lens 21 and the prism mirror 22 function as a first projection optical system 12*a* on which image light ML from the first image forming element 11*a* is incident, and the see-through mirror 23 functions as a partially transmissive mirror 123 that partially reflects the image light ML emitted from the above first projection optical system 12*a* toward a pupil position PP or the eye EY. The first display section 20*a* includes the first projection optical system 12*a* and the see-through mirror 23 in an integrated state. The projection lens 21 constituting the first projection optical system 12*a* corresponds to a first optical member 2*a* disposed on a light emission side of the first image forming element 11*a*, and the prism mirror 22 corresponds to a second optical member 2*b* disposed on a light emission side of the first optical member 2*a* which is the projection lens 21. Further, the first image forming element 11*a*, the projection lens 21, and the prism mirror 22 correspond to part of the first display driving unit 102*a* illustrated in FIG. 1, and the see-through mirror 23 is disposed on a light emission side of the second optical member 2*b* and corresponds to the first combiner 103*a* illustrated in FIG. 1. The projection lens 21 and the prism mirror 22 constituting the first projection optical system 12*a* are fixed together with the first image forming element 11*a* in a container-shaped barrel 41 in a mutually positioned state. The barrel 41 is a case CA that houses the first projection optical system 12*a* and the first image forming element 11*a* in a positioned state.

In the first display device 100A, the first image forming element 11*a* is an image-light generating device of a self-luminous type. The first image forming element 11*a* emits the image light ML to the first projection optical system 12*a*. The first image forming element 11*a* is housed and supported in the barrel 41 from behind. The first image forming element 11*a* is, for example, an organic electro-luminescence (EL) display, and forms a color still image or moving image on a two-dimensional display surface 11*d*. The first image forming element 11*a* performs display operation by being driven by a display control device 88 including the driving circuit member 80*a*. The first image forming element 11*a* is not limited to the organic EL display, and may be replaced with a display device using inorganic EL, an organic LED, an LED array, a laser array, a quantum dot light emission element, or the like. The first image forming element 11*a* is not limited to the image-light generating device of a self-luminous type, and it may be possible to employ a device including an LCD or other light modulating elements and illuminating the light modulating elements using a light source such as backlight to form an image. As for the first image forming element 11*a*, it may be possible to use liquid crystal on silicon (LCOS, LCOS is a registered trademark), a digital micro-mirror device, or the like, instead of the LCD. Note that an optical device obtained by excluding the driving circuit member 80*a* and the display control device 88 from the first display device 100A is also referred to as an optical module 100.

The first display section 20*a* includes two reflection surfaces, and an optical path is bent, by the see-through mirror 23 and the prism mirror 22. The first display section 20*a* is an off-axis optical system OS. The projection lens 21, the prism mirror 22, and the see-through mirror 23 are disposed to be non-axisymmetric. In this first display section 20*a*, by bending an optical axis AX in an off-axis surface parallel to a YZ plane which is a reference surface, the optical elements 21, 22 and 23 are arrayed along the off-axis surface (that is, the reference surface). Specifically, in the off-axis surface parallel to the YZ plane and corresponding to a plane of paper, an optical path portion P1 from the projection lens 21 to a reflection surface 22*b*, an optical path portion P2 from the reflection surface 22*b* to the see-through mirror 23, and an optical path portion P3 from the see-through mirror 23 to the pupil position PP are arranged so as to be bent in a Z shape in two stages.

In the first display section 20*a*, the optical path portion P1 from the projection lens 21 to the reflection surface 22*b* extends in a slightly obliquely upward direction or a direction nearly parallel to the Z direction toward a back side with respect to a viewpoint. The optical path portion P2 from the reflection surface 22*b* to the see-through mirror 23 extends obliquely downward toward a front side. With a horizontal plane direction (XZ plane) as a reference, an inclination of the optical path portion P2 is larger than an inclination of the optical path portion P1. The optical path portion P3 from the see-through mirror 23 to the pupil position PP extends slightly obliquely upward or in a direction nearly parallel to the Z direction toward the back side. In the illustrated example, a portion of the optical axis AX corresponding to the optical path portion P3 corresponds to about −10°, with a downward direction toward the +Z direction as negative. That is, a see-through mirror 23 reflects the image light ML with the optical axis AX or the optical path portion P3 directed upward by a predetermined angle, that is, upward by about 10°. As a result, an exit optical axis EX obtained by extending a portion of the optical axis AX that corresponds to the optical path portion P3 extends so as to be tilted downward by approximately 10° relative to a central axis HX parallel to the +Z direction at the front.

In the first display section 20*a*, the projection lens 21 includes a first lens 21*o*, a second lens 21*p*, and a third lens 21*q*. The projection lens 21 receives the image light ML emitted from the first image forming element 11*a* and causes the image light ML to be incident on the prism mirror 22. The projection lens 21 focuses the image light ML emitted from the first image forming element 11*a* into a state close to a parallel luminous flux. Optical surfaces of the first lens 21*o*, the second lens 21*p*, and the third lens 21*q* constituting the projection lens 21, that is, incident surfaces and emission surfaces of these lenses are free form surfaces or aspherical surfaces. The incident surfaces and the emission surface of the first lens 21*o*, the second lens 21*p*, and the third lens 21*q* are each asymmetric with respect to a longitudinal direction parallel to the YZ plane and intersecting the optical axis AX with the optical axis AX interposed therebetween, and are each symmetric with respect to the lateral direction or the X direction with the optical axis AX interposed therebetween.

The first lens 21*o*, the second lens 21*p*, and the third lens 21*q* are made of, for example, resin, but may also be made of glass. An antireflection film can be formed at each of the optical surfaces of the first lens 21*o*, the second lens 21*p* and the third lens 21*q* constituting the projection lens 21.

The prism mirror 22 is an optical member having a refractive reflection function that is a mixture of a mirror function and a lens function, and refracts and reflects the image light ML from the projection lens 21. The prism mirror 22 includes an incident surface 22*a* arranged on the light emission side of the first optical member 2*a*, the reflection surface 22*b* for bending the optical axis AX, and an emission surface 22*c* facing the reflection surface 22*b* and arranged in a direction symmetrical to the incident surface 22*a*. The prism mirror 22 emits the image light ML incident from the front side, at which the projection lens 21 is disposed, with the image light ML bent in a direction inclined downward with respect to a direction reverse to an incident direction (a direction of a light source as seen from the prism mirror 22). The incident surface 22*a*, the reflection surface 22*b*, and the emission surface 22*c* which are the optical surfaces constituting the prism mirror 22 are asymmetrical to the longitudinal direction parallel to the YZ plane and intersecting the optical axis AX with the optical axis AX interposed therebetween, and are symmetrical to the lateral direction or the X direction with the optical axis AX interposed therebetween. The optical surfaces of the prism mirror 22, that is, the incident surface 22*a*, the reflection surface 22*b* and the emission surface 22*c* are, for example, free form surfaces. The incident surface 22*a*, the reflection surface 22*b* and the emission surface 22*c* are not limited to the free form surfaces, and may be aspherical surfaces. The prism mirror 22 may be made of, for example, resin, but may also be formed of glass. The reflection surface 22*b* is not limited to one that reflects the image light ML by total reflection, and may be a reflection surface constituted by a metal film or a dielectric multilayer film. In this case, a reflection film formed of a single layer film or multilayer film formed of metal such as Al or Ag is formed above the reflection surface 22*b* by vapor deposition or the like, or a sheet-shaped reflection film formed of metal is affixed thereto. Although detailed illustration is omitted, an antireflection film can be formed above the incident surface 22*a* and the emission surface 22*c*.

The emission surface 22*c* of the prism mirror 22 is a concave surface as a whole, is a concave surface on the off-axis plane that is parallel to the YZ plane and through which the optical axis AX passes, that is, on the plane of paper, and is also a concave surface in a cross-section CS perpendicular to the YZ plane and passing through a center of the emission surface 22*c*. The emission surface 22*c* of the prism mirror 22 is exposed at an emission opening 410 of the barrel 41, thus by being formed as the concave surface, contact with an external object can be easily avoided and occurrence of damage can be suppressed. The emission surface 22*c* of the prism mirror 22 is arranged near an intermediate image IM and is arranged at a position where a light flux cross-section of the image light ML is narrowed, thus an area thereof can be made relatively small. By making the area of the emission surface 22*c* of the prism mirror 22 relatively small, it is also possible to suppress damage occurring in the emission surface 22*c*.

The see-through mirror 23, that is, the first combiner 103*a* is a curved plate-shaped reflective optical member that functions as a concave surface mirror, and partially reflects the image light ML from the prism mirror 22, and partially transmits outside light OL. The see-through mirror 23 reflects the image light ML from the prism mirror 22 toward the pupil position PP. The see-through mirror 23 includes a reflection surface 23*a* and an outer surface 230. The see-through mirror 23 is a concave mirror that covers the pupil position PP at which the eye EY or the pupil is arranged, has a concave shape toward the pupil position PP, and has a convex shape toward the outside. The pupil position PP or an opening PPa thereof is referred to as an eye point or an eye box, and corresponds to an emission pupil EP of the first display section 20*a* including the see-through mirror 23. The see-through mirror 23, as the concave mirror having positive power, enables enlarged viewing of the intermediate image IM formed by the first image forming element 11*a* and re-imaged by the first projection optical system 12*a*.

The see-through mirror 23 has a structure in which a transmissive reflective film 23*a* is formed above a back surface of a plate-shaped body 23*b*. The reflection surface 23*a* of the see-through mirror 23 is asymmetric with respect to the longitudinal direction parallel to the YZ plane and intersecting the optical axis AX, with the optical axis AX interposed therebetween, and is symmetric with respect to the lateral direction or the X direction with the optical axis AX interposed therebetween. The reflection surface 23*c* of the see-through mirror 23 is, for example, a free form surface. The reflection surface 23*c* is not limited to the free form surface, and may be an aspherical surface.

The reflection surface 23*c* of the see-through mirror 23 transmits a part of light when the image light ML is reflected. Thus, because the outside light OL passes through the see-through mirror 23, see-through view of the outside is enabled, and a virtual image can be superimposed on an outside image. At this time, when the plate-shaped body 23*b* has a thickness of less than or equal to approximately a few millimeters, a change in magnification of the outside image can be curbed to be small. A reflectance of the reflection surface 23*c* with respect to the image light ML and the outside light OL is set to from 10% to 50% in a range of an incident angle of the assumed image light ML from the viewpoint of ensuring a brightness of the image light ML and facilitating observation of the outside image by see-through. The plate-shaped body 23*b* which is a base material of the see-through mirror 23 is formed of, for example, resin, and may also be formed of glass. The plate-shaped body 23*b* is formed of the same material as a support plate 61 that supports the plate-shaped body 23*b* from the surrounding thereof, and has the same thickness as the support plate 61. The transmissive reflective film 23*a* is formed of, for example, a dielectric multilayer film configured of a plurality of dielectric layers having an adjusted film thickness. The transmissive reflective film 23*a* may be a single-layer film or a multilayer film of metal such as Al or Ag of which a film thickness has been adjusted. The transmissive reflective film 23*a* may be formed by laminating using deposition, for example, and may also be formed by affixing a sheet-shaped reflection film. An antireflection film is formed at the outer surface 230 of the plate-shaped body 23*b*.

The optical path will be described. The image light ML from the first image forming element 11*a* enters the projection lens 21 and is output from the projection lens 21 in a substantially collimated state. The image light ML that has passed through the projection lens 21 is incident on the prism mirror 22, passes through the incident surface 22*a* while being refracted by the incident surface 22*a*, is reflected by the reflection surface 22*b* with a high reflectance close to 100%, and is refracted again by the emission surface 22*c*. The image light ML from the prism mirror 22, after once forming the intermediate image IM, is incident on the see-through mirror 23 and is reflected by the reflection surface 23*c* with a reflectance of about 50% or less. The image light ML reflected by the see-through mirror 23 is incident on the pupil position PP at which the eye EY or pupil of the wearer US is placed. The outside light OL that has passed through the see-through mirror 23 and the support plate 61 therearound is also incident on the pupil position PP. In other words, the wearer US wearing the first display device 100A can observe a virtual image of the image light ML in a state where it is superimposed on an external image.

Figure 3:
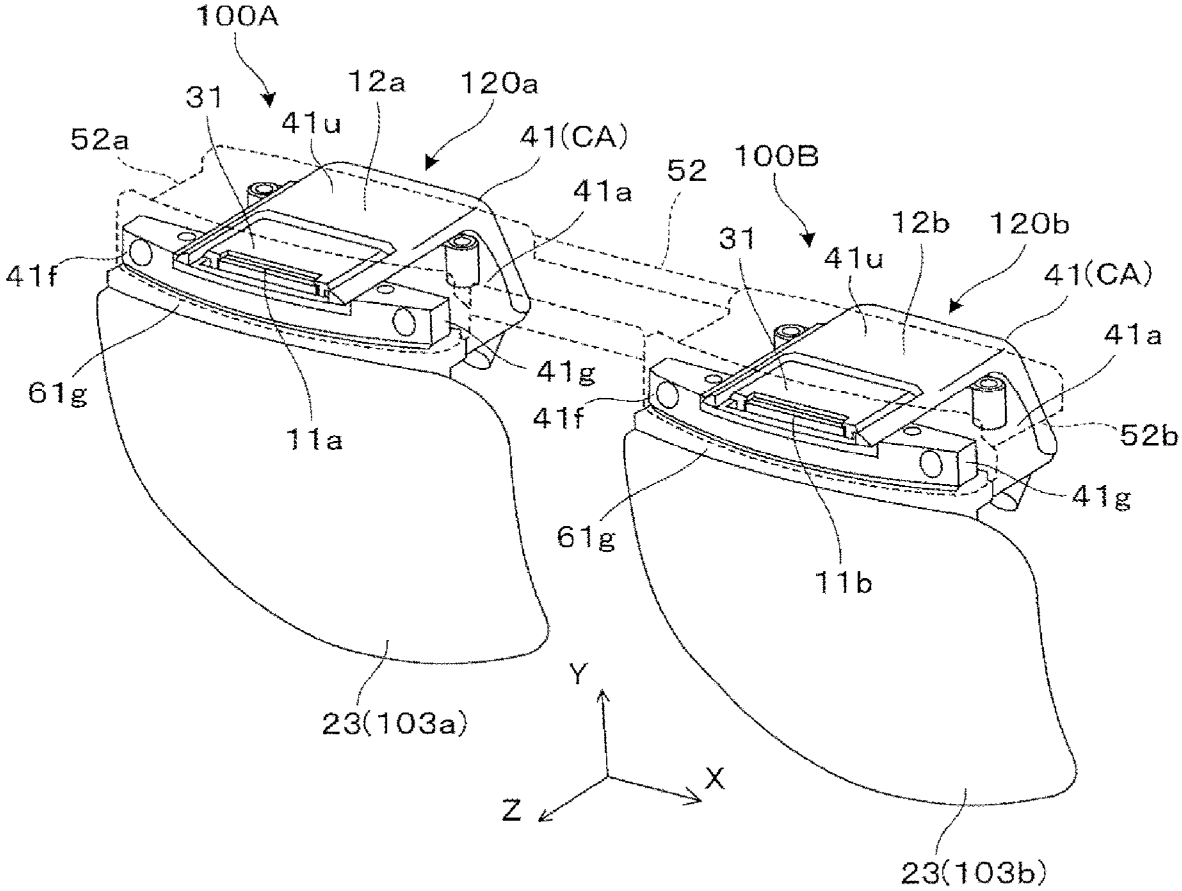

Referring to FIG. 3, in the first display device 100A, the first imaging optical system 120*a* is housed in the barrel 41, that is, the case CA, fixed to a portion 52*a* on the −X side of an elongated frame 52 indicated by a dotted line by using, for example, an adhesive, and is supported so as to be suspended from the frame 52 and disposed below the frame 52. In the second display device 100B, the second imaging optical system 120*b* is housed in the barrel 41, that is, the case CA, fixed to a portion 52*b* on the +X side of the elongated frame 52 indicated by the dotted line by using, for example, an adhesive, and is supported so as to be suspended from the frame 52 and disposed below the frame 52. The frame 52 is made of a metal material such as, for example a magnesium alloy from the viewpoint of ensuring rigidity and lightweight properties. The frame 52 includes a recess RE for disposing the driving circuit member 80*a* on an upper side, and is covered from above and below by an exterior member 71 together with the barrel 41 (see FIG. 2).

The first imaging optical system 120*a* includes the first projection optical system 12*a* and the first combiner 103*a* in an integrated state, and the second imaging optical system 120*b* includes a second projection optical system 12*b* and the second combiner 103*b* in an integrated state. In the barrel 41 housing the first projection optical system 12*a*, an upper end 61*g* of the first combiner 103*a* is fixed to the barrel 41 by adhesion or the like in a positioned state. The barrel 41 supporting the first combiner 103*a* includes a space for housing the first image forming element 11*a* in addition to the first projection optical system 12*a*, and supports the first image forming element 11*a* and the like in a positioned state with respect to the projection lens 21 and the like illustrated in FIG. 2 and the like. In the barrel 41 housing the second projection optical system 12*b*, the upper end 61*g* of the second combiner 103*b* is fixed to the barrel 41 by adhesion or the like in a positioned state. The barrel 41 supporting the second combiner 103*b* includes a space for housing a second image forming element 11*b* in addition to the second projection optical system 12*b*, and supports the second image forming element 11*b* in a positioned state with respect to one similar to the projection lens 21 and the like illustrated in FIG. 2 and the like.

Figure 4:
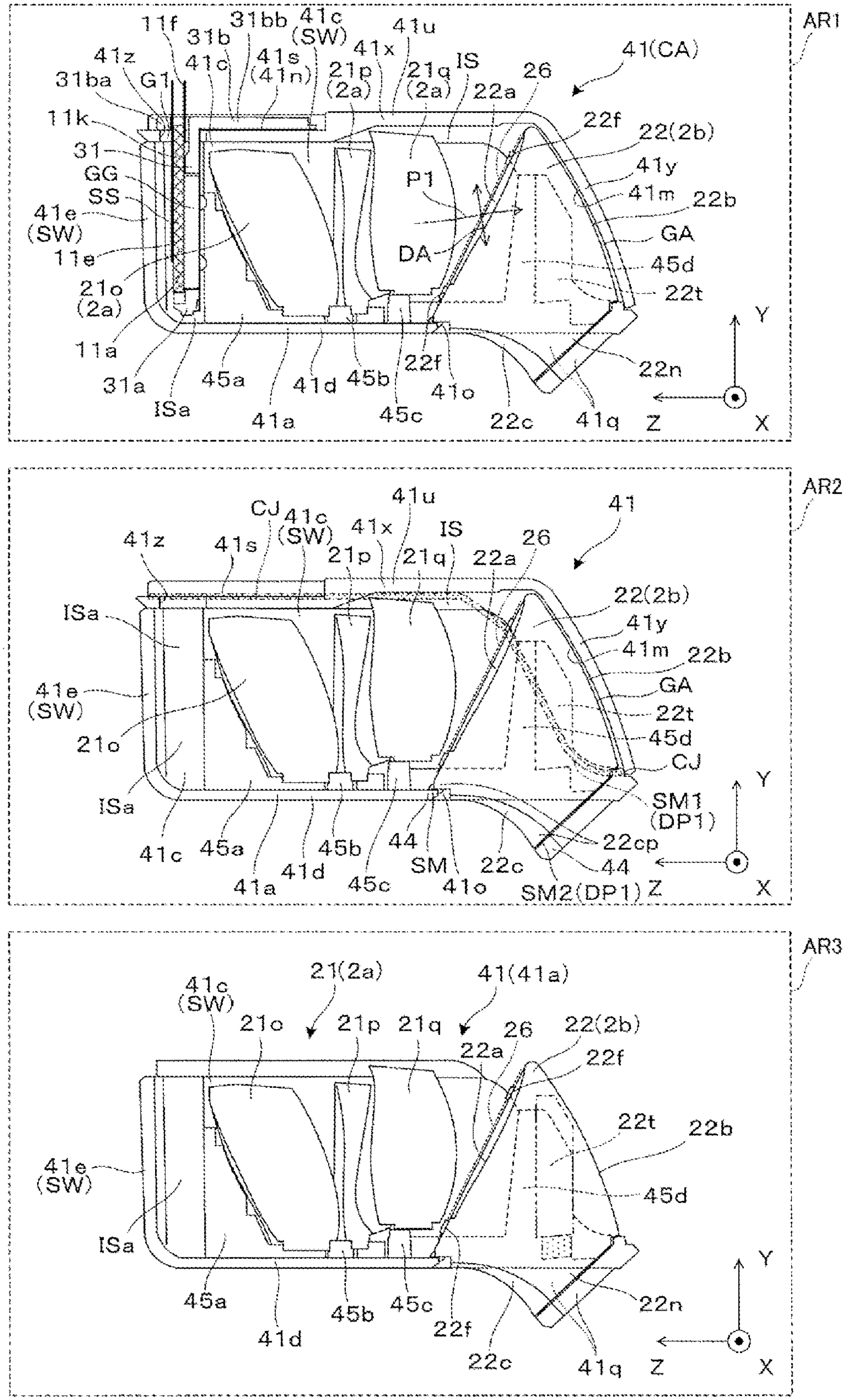

A structure of the barrel 41, that is, the case CA, will be described with reference to FIGS. 4 and 5. In FIG. 4, a region AR1 is a side cross-sectional view of the barrel 41 and the first image forming element 11*a* and the optical members 2*a* and 2*b* held by the barrel 41, a region AR2 is a side cross-sectional view of a state in which the first image forming element 11*a* and the like are excluded, and a region AR3 is a side cross-sectional view of a state in which a barrel cover 41*u* is further excluded. In addition, in FIG. 5, a region BR1 is a rear view of a state in which the barrel cover 41*u* is removed, and a region BR2 is a plan view of a rear end portion in a state in which the barrel cover 41*u* is removed.

The barrel 41 or the case CA includes a barrel body 41*a* and the barrel cover 41*u*, houses the first optical member 2*a* and holds the second optical member 2*b*. The barrel body 41*a* and the barrel cover 41*u* are made of a resin material such as polycarbonate resin to which a black pigment is added to provide light-shielding properties. The barrel body 41*a* is a bathtub-shaped vessel with an open top, and includes the emission opening 410 at a part of a bottom. The barrel cover 41*u* is fixed so as to cover the barrel body 41*a* from above. The barrel body 41*a* includes two side plate members 41*c*, a bottom plate member 41*d*, a front plate member 41*e* and two protruding portions 41*f* and 41*g* (see FIG. 5). Among them, the two side plate members 41*c* and the front plate member 41*e* are collectively referred to as side walls SW. The two side plate members 41*c* extend substantially parallel to a reference plane HS (see FIG. 5) in which the optical axis AX extends and are spaced apart from each other. The bottom plate member 41*d* extends substantially parallel to the XZ plane perpendicular to the reference plane HS in which the optical axis AX extends, and is provided with the emission opening 410 at a rear end thereof. In the bottom plate member 41*d*, a guard member 41*q* is provided behind and beside the emission opening 410, and covers a side surface 22*n* and the like of a lower portion of the second optical member 2*b*. The front plate member 41*e* links a front end of the bottom plate member 41*d* and front ends of the two side plate members 41*c*. The two protruding portions 41*f* and 41*g* extend in the lateral direction so as to protrude outward from upper portions of the two side plate members 41*c*.

At an inside of the side plate member 41*c* on one side, guide convex portions 45*a*, 45*b*, 45*c* and 45*d* each having steps, as protrusions for supporting the first lens 21*o*, the second lens 21*p* and the third lens 21*q* constituting the first optical member 2*a*, and the prism mirror 22 of the second optical member 2*b* are formed. Note that although not illustrated, guide convex portions similar to the guide convex portions 45*a*, 45*b*, 45*c*, and 45*d* are also formed at an inner surface of the side plate member 41*c* on another side (see FIG. 5). The first lens 21*o* is bonded in a biased and positioned state by the two facing first guide convex portions 45*a* provided at the inner surfaces of the two side plate members 41*c* and is supported by the barrel body 41*a*. Similarly, the second lens 21*p* is bonded in a positioned state by the second guide convex portion 45*b*, and is supported by the barrel body 41*a*. The third lens 21*q* is bonded in a positioned state by the third guide convex portion 45*c*, and is supported by the barrel body 41*a*. The prism mirror 22 is bonded in a positioned state by the fourth guide convex portion 45*d* via a protrusion 22*t* (see FIG. 5) provided at a side surface 22*s* of the prism mirror 22, and is supported by the barrel body 41*a*.

The barrel cover 41*u* is disposed on an opposite side of the bottom plate member 41*d* and covers an inside of the barrel body 41*a* to form a housing space IS. The barrel cover 41*u* includes a top plate 41*x* and a rear plate 41*y*. The top plate 41*x* extends parallel to the XZ plane, and the rear plate 41*y* is arranged to be inclined so as to cover an outside of the reflection surface 22*b* of the prism mirror 22 of the second optical member 2*b*. In the barrel cover 41*u*, a positioning holder pedestal 41*s* lowered by a predetermined height from a periphery is formed at the front +Z side, and an insertion opening 41*z* is formed in front of the holder pedestal 41*s*. The holder pedestal 41*s* provided at the barrel cover 41*u* faces a base plate 31*b* of the holder 31 for the first image forming element 11*a*. The base plate 31*b* is fixed to the barrel 41 while covering a part or all of the insertion opening 41*z*. An inner surface 41*m* of the rear plate 41*y* is inclined with respect to the XZ plane and the XY plane, and extends along the reflection surface 22*b* of the prism mirror 22 to the vicinity of the reflection surface 22*b*. A uniform gap GA is formed between the outside of the reflection surface 22*b* and the inner surface 41*m* of the rear plate 41*y*.

Figure 6:
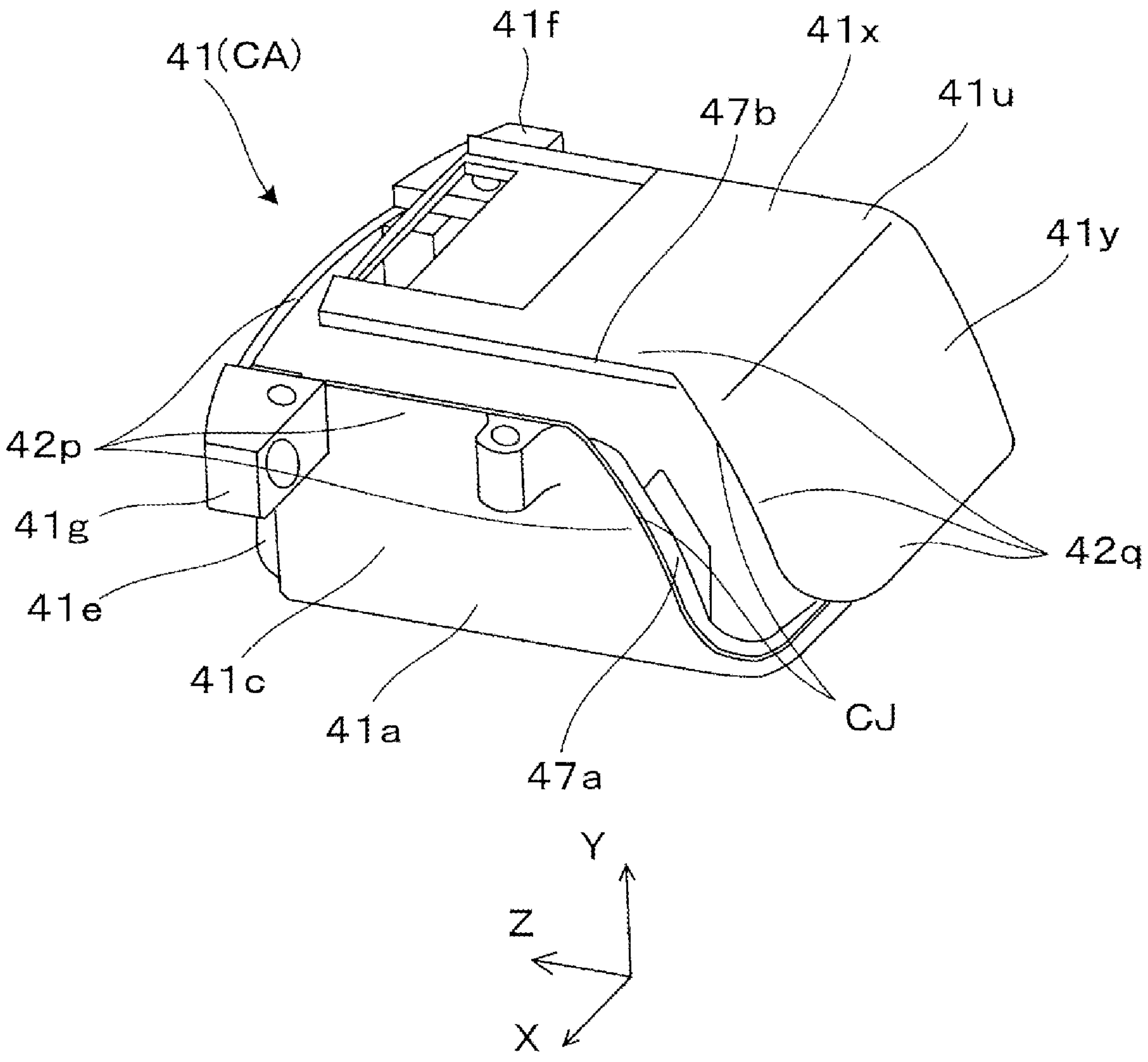
FIG. 6 is an exploded perspective view of the barrel.

As illustrated in FIG. 6, between an outer edge 42*q* extending along an outer periphery of the barrel cover 41*u* and an upper end 42*p* of the barrel body 41*a*, fitting configurations 47*a* and 47*b* such as steps are provided, for example, thus mutual positioning can be achieved. The outer edge 42*q* of the barrel cover 41*u* and the upper end 42*p* of the barrel body 41*a* constitute a coupling portion CJ between the body and the cover. In the coupling portion CJ, a gap between the outer edge 42*q* of the barrel cover 41*u* and the upper end 42*p* of the barrel body 41*a*, that is, a gap between the fitting configurations 47*a* and 47*b* and the outer edge 42*q* or the upper end 42*p* is filled with a sealing member SM1 which functions as an adhesive or a seal material (see the region AR2 in FIG. 4). In this case, airtightness of the housing space IS can be enhanced.

Figure 5:
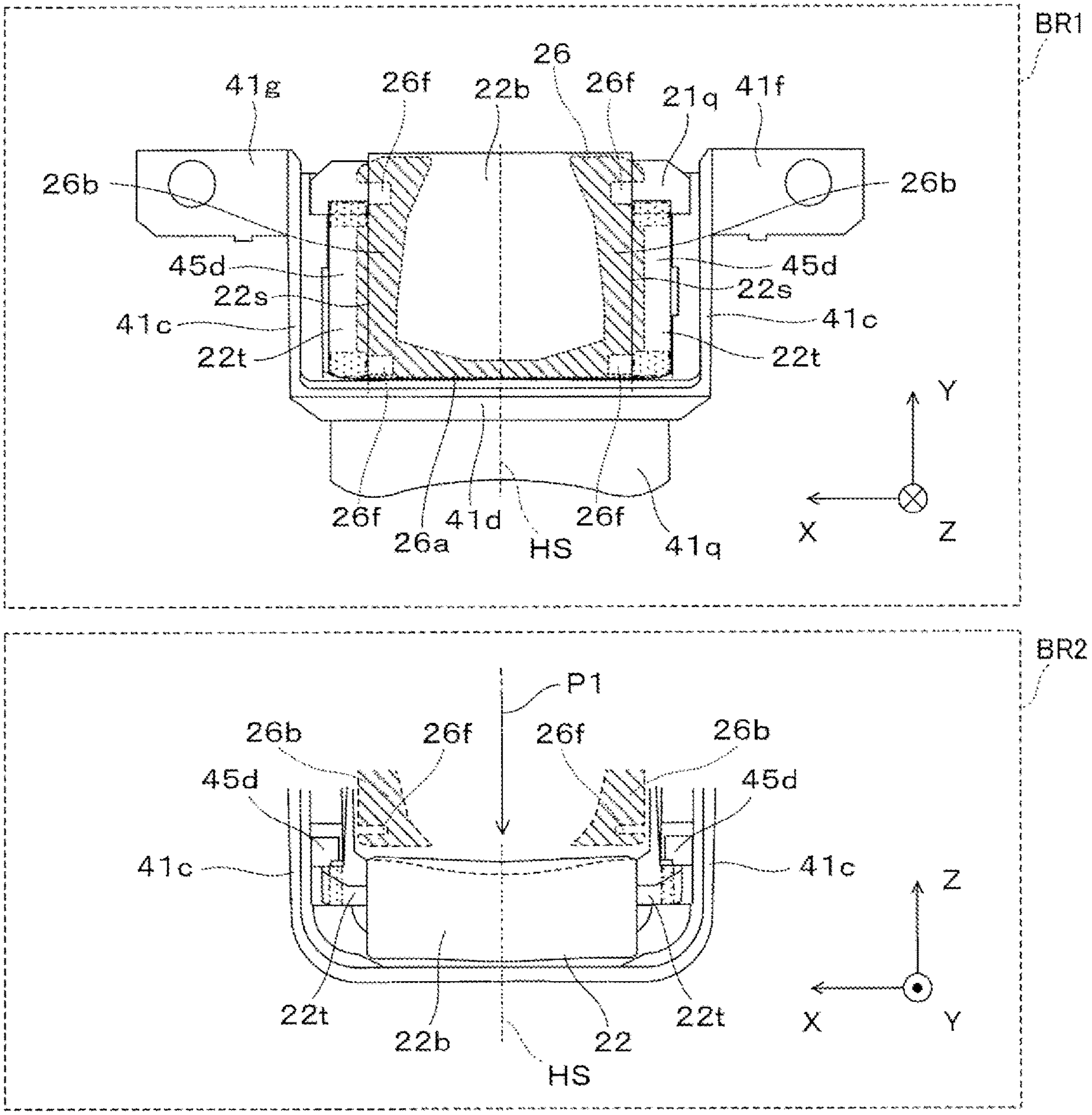
FIG. 5 illustrates a rear view and a plan view of a remaining part excluding a barrel cover from the barrel.

Referring to FIGS. 4 and 5, a diaphragm plate member 26 is arranged between the first optical member 2*a* and the second optical member 2*b* in the barrel 41. Referring to FIG. 5, the diaphragm plate member 26 includes a central portion 26*a* and two side portions 26*b*. That is, the diaphragm plate member 26 has a shape in which an upper end is opened. The diaphragm plate member 26 includes notches 26*f* at four positions on a periphery, and the notches 26*f* are fitted to four protrusions 22*f* (see FIG. 4) formed around the incident surface 22*a* of the prism mirror 22. Thus, the diaphragm plate member 26 is positioned with respect to the incident surface 22*a* of the prism mirror 22. The diaphragm plate member 26 is fixed to the protrusion 22*f* by an adhesive around the notch 26*f*.

Referring to FIG. 4, an interval between an outer edge 22*cp* of the emission surface 22*c* of the prism mirror 22 and an edge portion 44 of the emission opening 410, that is a gap and an inside thereof, is filled with a sealing member SM2 that functions as an adhesive or a seal material. The sealing member SM2 seals a gap between the emission opening 410 of the barrel body 41*a* and a periphery of the second optical member 2*b* or the emission surface 22*c* of the prism mirror 22. In this case, the emission surface 22*c* of the second optical member 2*b* is exposed outside, but an optical surface optically upstream of the emission surface 22*c* of the second optical member 2*b*, that is, an optical surface near the light source is protected by dust-proofing and water-proofing for the barrel 41.

In the above description, a combination of the sealing members SM1 and SM2 is referred to as a dust-proof structure DP1 of the optical members 2*a* and 2*b*. The dust-proof structure DP1 is formed of, for example, a photo-curable resin, and secures a dust-proof property of the barrel 41 or the case CA while maintaining a state where the optical members 2*a* and 2*b* are positioned with respect to the barrel 41.

In the barrel 41, the first image forming element 11*a* supported by the holder 31 is inserted into a space ISa facing the front plate member 41*e* from above through the insertion opening 41*z* and fixed in a positioned state. In this case, the first image forming element 11*a* is arranged in the barrel 41 and is less likely to be affected by impact from outside, and a situation in which misalignment occurs in position adjustment due to an operation error in a manufacturing process is less likely to occur.

Figure 7:
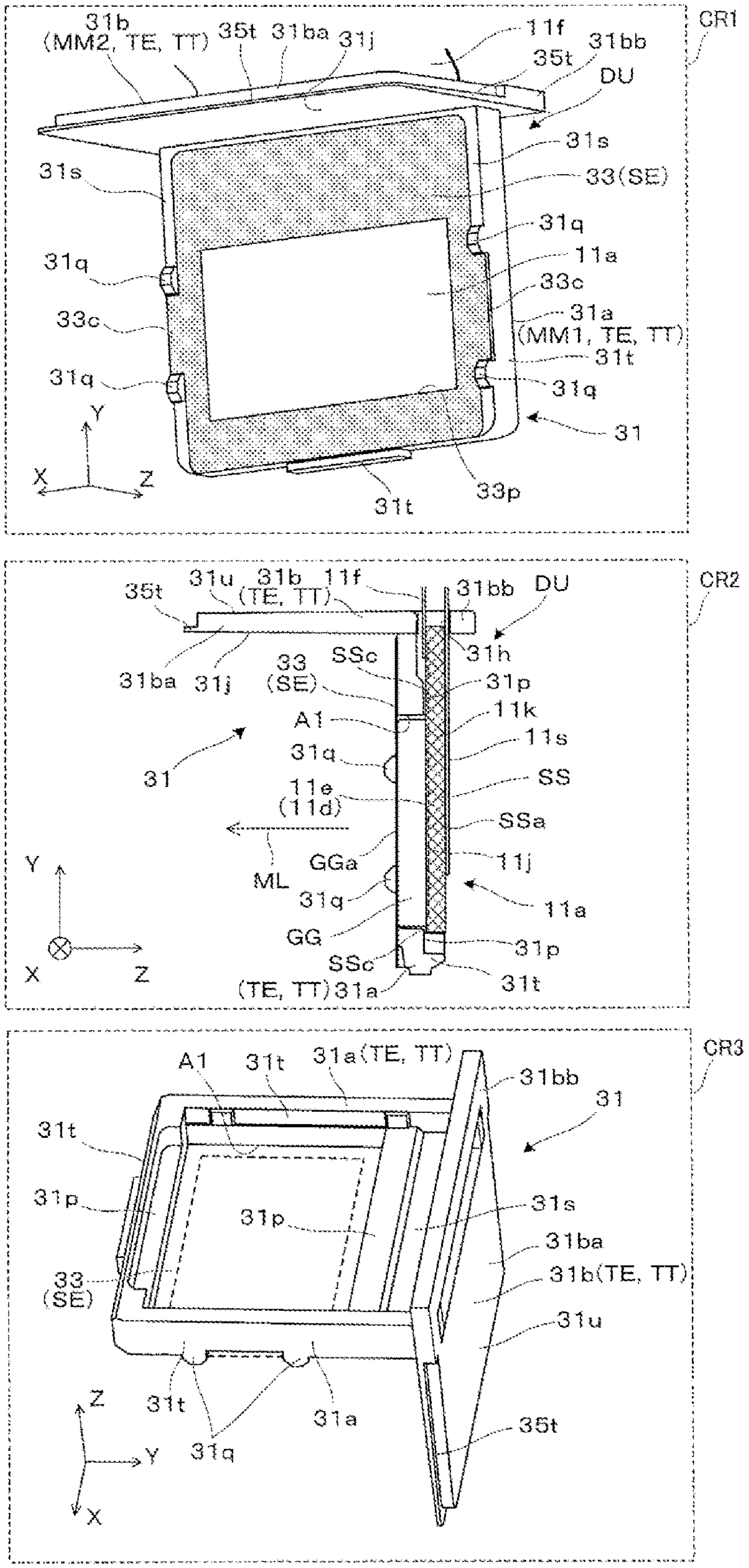
FIG. 7 illustrates a perspective view of a front side, a side cross-sectional view, and a perspective view of a back side illustrating a display unit.

FIG. 7 illustrates diagrams for explaining a display unit DU in which the first image forming element 11*a* is assembled to the holder 31. In FIG. 7, a region CR1 is a perspective view illustrating a front side of the display unit DU, a region CR2 is a side cross section of the display unit DU, and a region CR3 is a perspective view illustrating a back side of the holder 31.

In the display unit DU illustrated, the first image forming element 11*a* and an associated light shielding plate 33 are fixed to the holder 31 and are mutually positioned.

The first image forming element 11*a* includes a plate-shaped main body portion 11*k* and a flexible printed circuit (FPC) portion 11*f* that is coupled to an upper portion of the main body portion 11*k* and extends upward. In these portions, the main body portion 11*k* includes a silicon substrate SS in which a drive circuit 11*j* is formed and that forms an exterior of the main body portion 11*k*, a light-emitting layer 11*e* which is an organic EL element containing an organic EL material and generates light of a color needed for the image light ML, and a protective glass GG for encapsulation that seals the light-emitting layer 11*e* in cooperation with the silicon substrate SS. Here, the light-emitting layer 11*e* corresponds to the display surface 11*d*. The first image forming element 11*a* emits the image light ML toward the protective glass GG side by performing light emission operation in accordance with a drive signal received from the FPC portion 11*f*. An elastic heat dissipation sheet 11*s* can be attached to a back surface SSa of the silicon substrate SS. The heat dissipation sheet 11*s* is made of graphite, for example, and is bonded to the back surface SSa of the silicon substrate SS using an adhesive having high thermal conductivity. Although not illustrated, the heat dissipation sheet 11*s* is fixed to the first frame 52 made of metal (see FIGS. 2 and 3) on a tip side, and has an effect of cooling the silicon substrate SS by heat conduction. The heat dissipation sheet 11*s* may have a laminated structure in which a plurality of sheets are bonded together.

The holder 31 is a member formed of, for example, a resin having optical transparency, and has an outer shape in a T-shape in side view. The holder 31 includes a support frame 31*a* that supports the first image forming element 11*a*, and the base plate 31*b* that is coupled to an upper portion of the support frame 31*a* and extends in a direction intersecting (specifically an orthogonal direction) the support frame 31*a*. The support frame 31*a* corresponds to a supporting member MM1, and the base plate 31*b* corresponds to a fixing member MM2. Although details will be described later, the holder 31 includes a transparent portion TT, and the base plate 31*b* of the holder 31 is fixed to the outside of the case CA with an adhesive material AM. The adhesive material AM is interposed between the transparent portion TT and the case CA. In the embodiment, the support frame 31*a* and the base plate 31*b* are separate members. With this, it is possible to facilitate manufacturing and assembly of members including the transparent portion TT among the support frame 31*a* and the base plate 31*b*.

The support frame 31*a* is inserted into the barrel 41 via the insertion opening 41*z* (see FIG. 4) formed at the barrel 41 while supporting the first image forming element 11*a*. The base plate 31*b* is coupled to a root side of the support frame 31*a*, and is not inserted into the barrel 41. The support frame 31*a* has a rectangular outer shape and includes a flat plate portion 31*s* and a frame portion 31*t*. An upper end of the flat plate portion 31*s* is coupled to the base plate 31*b*. The frame portion 31*t* has a U shape and surrounds the first image forming element 11*a* from left and right directions and a lower direction. The support frame 31*a* includes a rectangular opening A1 surrounded by the flat plate portion 31*s* and the frame portion 31*t*. The protective glass GG of the first image forming element 11*a* is arranged so as to be fitted into the opening A1. Inside the support frame 31*a*, two support regions 31*p* extending parallel to the lateral X direction are formed at an upper portion and a lower portion in the Y direction. Both the support regions 31*p* are bonded to upper and lower surface regions SSc of the silicon substrate SS of the first image forming element 11*a* via adhesives. As a result, the first image display element 11*a* is supported in a state of being positioned with respect to the support frame 31*a*, and the display surface 11*d* of the first image forming element 11*a* can be brought into a predetermined state of being positioned substantially parallel to the XY plane. The light shielding plate 33 is fixed to the −Z side of the support frame 31*a*.

The support frame 31*a* includes a transparent component TE and a light shielding member SE. The transparent component TE is the transparent portion TT, and corresponds to the flat plate portion 31*s* and the frame portion 31*t*. The light shielding member SE corresponds to the light shielding plate 33. Although details will be described later, the transparent portion TT or the transparent component TE can prevent the adhesive material AM that enters into the case CA out of the adhesive material AM that fixes the holder 31 from being uncured. Accordingly, it is possible to prevent the adhesive material AM from adhering to the first image forming element 11*a* attached to the support frame 31*a*. The light shielding member SE can prevent image deterioration caused by reflection, transmission, diffusion, or the like of a light beam emitted from the first image forming element 11*a* at the transparent portion TT or the transparent component TE.

The base plate 31*b* has a rectangular flat plate exterior, and a lower surface 31*j* extends in parallel with the XZ plane. The base plate 31*b* is placed at the holder pedestal 41*s* formed at the barrel cover 41*u* of the barrel 41, and is fixed to the holder pedestal 41*s* after positioning (see FIG. 4). As a result, the lower surface 31*j* which is a first surface formed at the base plate 31*b* and a bearing surface 41*n* which is a second surface formed at the holder pedestal 41*s* face each other. An upper surface 31*u* of the base plate 31*b* is smooth and flat so as to facilitate suction or support of a three-dimensional driving device by an arm to be described later.

The base plate 31*b* includes a first member 31*ba* extending to a front side which is the light emission side or the −Z side of the first image forming element 11*a* and a second member 31*bb* extending to a rear side which is an opposite side to the light emission side or the +Z side of the first image forming element 11*a*. The first member 31*ba* is supported, in the holder pedestal 41*s*, on the −Z side of the insertion opening 41*z* (see FIG. 4). The second member 31*bb* is supported, in the holder pedestal 41*s*, on an end portion on the +Z side of the insertion opening 41*z* (see FIG. 4). Therefore, when the display unit DU or the holder 31 is assembled to the barrel 41, the support frame 31*a* or the first image forming element 11*a* is easily prevented from being inclined with respect to the optical axis AX. Further, the second member 31*bb* closes the gap G1 remaining on the +Z side of the insertion opening 41*z*. That is, the base plate 31*b* is shaped to cover the insertion opening 41*z*. As a result, the insertion opening 41*z* can be entirely closed at the stage where the holder 31 is inserted into the barrel 41, thereby enhancing a dust-proof effect.

The base plate 31*b* as a whole includes the transparent component TE which is the transparent portion TT. As a result, it is possible to prevent the adhesive material AM from being uncured in the entire base plate 31*b*. The base plate 31*b* is about 1 mm thick.

The light shielding plate 33 is fixed to the support frame 31*a* of the holder 31 by using an adhesive or a sticky material. The light shielding plate 33 is a flare stop provided with a rectangular opening 33*p*, and is formed of metal, resin, or the like having light-shielding properties. The light shielding plate 33 can suppress stray light generated when a light beam emitted from the first image forming element 11*a* is reflected, transmitted, diffused, or the like by the transparent portion TT or the transparent component TE, thereby preventing image deterioration. The effective image light ML emitted from the display surface 11*d* of the first image forming element 11*a* passes through the opening 33*p* without being shielded by the light shielding plate 33. When the light shielding plate 33 is fixed, four protrusions 31*q* formed at the support frame 31*a* can be used for positioning. The four protrusions 31*q* grasp protruding portions 33*c* formed on left and right sides of the light shielding plate 33 from above and below, and a light-shielding plate 33 is appropriately positioned with respect to the support frame 31*a*. The light shielding plate 33 can be permanently fixed to the support frame 31*a* by using an adhesive.

Note that instead of the light shielding plate 33, the flat plate portion 31*s* of the support frame 31*a* may be subjected to processing such as black coating or black tape attachment. By painting out the flat plate portion 31*s* in black, light reflected by an edge of a lens or the like is prevented.

The FPC unit 11*f* and the heat dissipation sheet 11*s* extend outward the barrel 41 through a hole 31*h* formed at the second member 31*bb*. An adhesive can be applied and filled around the hole 31*h* for the purpose of ensuring dust-proofing and water-proofing.

As described above, in the embodiment, the support frame 31*a* and the base plate 31*b* constituting the holder 31 include the transparent portion TT or the transparent component TE. The holder 31 is a transparent member as a whole except the light shielding plate 33. The transparent component TE is, for example, an optical transparent member that transmits ultraviolet light or an ultraviolet ray. In other words, the transparent component TE is transparent for a specific wavelength of an ultraviolet ray. Here, "transparent" means that a transmittance at a wavelength from 300 nm to 450 nm is 20% to 30%.

As a material of the transparent component TE, for example, polycarbonate is used in view of heat resistance and strength. Since polycarbonate has a high refractive index and a large total reflection angle, light entering the transparent component TE does not easily escape and is guided to an inside of the transparent component TE. Polycarbonate readily absorbs an ultraviolet ray having a wavelength of 365 nm. Therefore, when polycarbonate is used for the transparent component TE, a wavelength of irradiation light for curing the adhesive material AM is set to 385 nm. A curing time of the adhesive material AM depends on an illuminance of an ultraviolet ray, but is about 20 to 30 seconds. Note that the wavelength of the irradiation light varies depending on the material of the transparent component TE and a type of the adhesive material AM.

Note that although not illustrated, when the base plate 31*b* includes the transparent component TE in the holder 31, a light shielding member may be provided at an upper portion of the base plate 31*b*. For example, as the light shielding member, a metal plate may be provided at the upper portion of the base plate 31*b*. Further, the upper portion of the base plate 31*b* may be subjected to processing such as black coating or black tape attachment.

Figure 8:
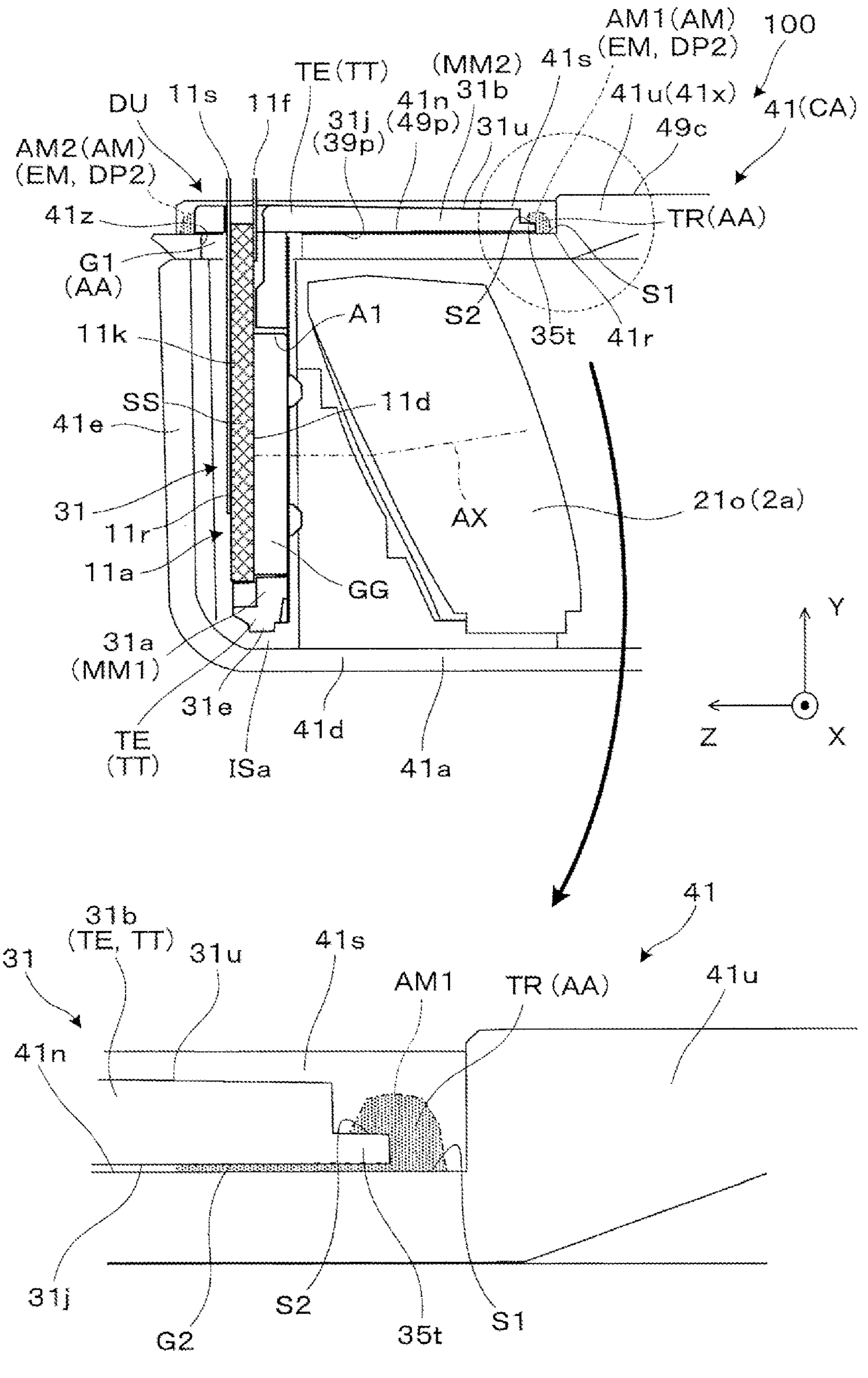
FIG. 8 illustrates enlarged cross-sectional views of a barrel front portion.
Figure 9:
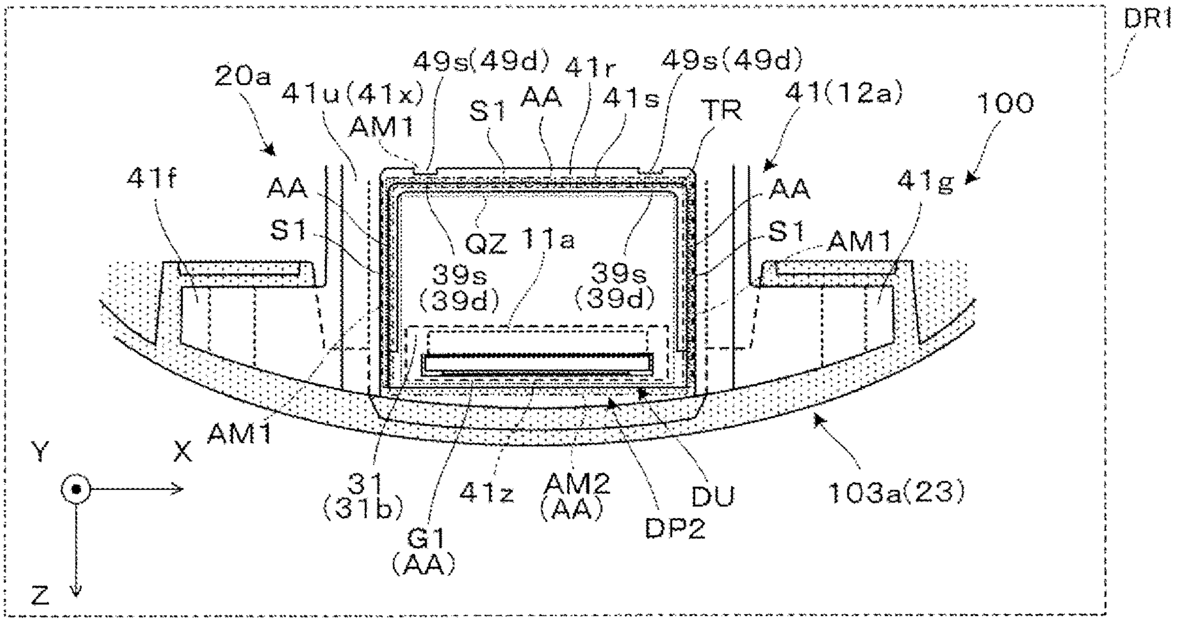
FIG. 9 illustrates plan views of an optical module.
Figure 9:
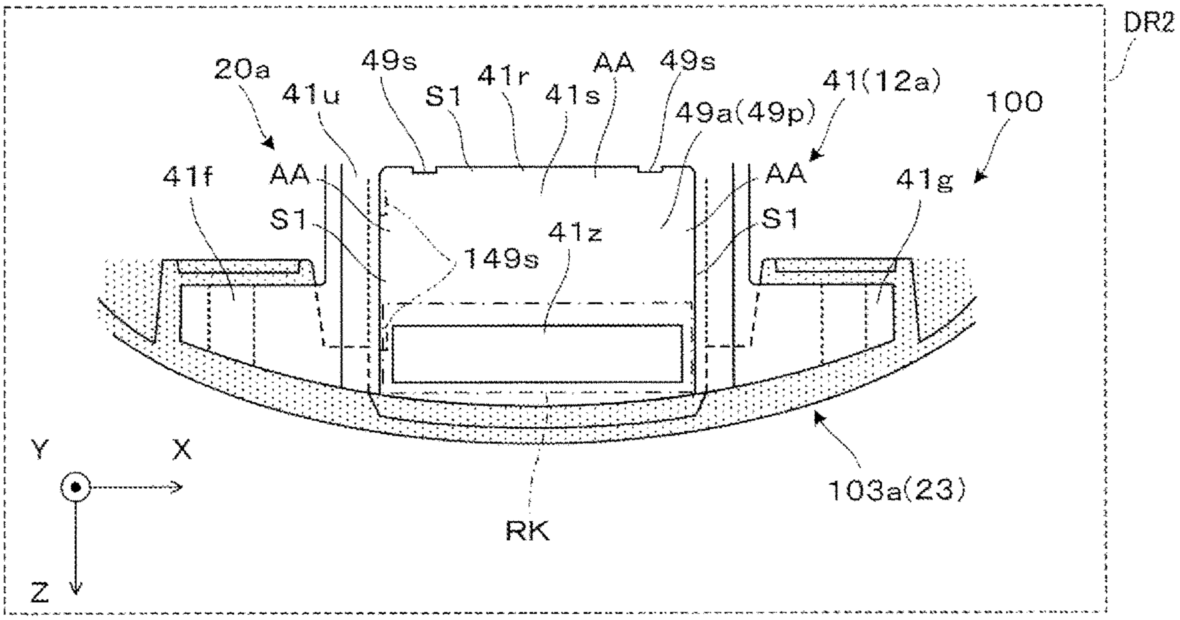

A fixing method of the display unit DU to the barrel 41 will be described with reference to FIGS. 8 and 9. FIG. 8 illustrates enlarged cross-sectional views for explaining a main part of the optical module 100, and FIG. 9 illustrates diagrams for explaining an assembly method of the optical module 100. In FIG. 9, a region DR1 is a plan view illustrating a state in which the display unit DU is assembled to the barrel 41, and a region DR2 is a plan view illustrating a state before the display unit DU is assembled. Here, the optical module 100 is obtained by assembling the display unit DU including the first image forming element 11*a* to the first display section 20*a* in which the first projection optical system 12*a* including the barrel 41 and the first combiner 103*a* are combined.

A step S1 is formed at an edge portion 41*r* on left, right and back sides of the holder pedestal 41*s* formed at the top plate 41*x* of the barrel cover 41*u*, which is the upper surface of the barrel 41. That is, a height of an initial abutment surface 49*p* which is the upper surface or the bearing surface 41*n* of the holder pedestal 41*s* is less than a height of an upper surface 49*c* of the top plate 41*x*. The step S1 of the holder pedestal 41*s* and a vicinity thereof hold an adhesive AM1 as the adhesive material AM that couples the holder 31 and the barrel 41. As described above, the adhesive AM1 is a photo-curable type adhesive and is, for example, an acrylic ultraviolet curable resin. The adhesive AM1 is cured after positioning of the holder 31 described later.

When an end portion 31*e* which is a lower end of the support frame 31*a* of the holder 31 of the display unit DU is inserted from the insertion opening 41*z* and the entire support frame 31*a* is caused to enter the barrel 41 together with the first image forming element 11*a*, the first image forming element 11*a* is housed in the space ISa and the base plate 31*b* is placed so as to be fitted into the recessed holder pedestal 41*s*. At this time, most of the insertion opening 41*z* is closed by the base plate 31*b*, thereby preventing dust and dirt from entering the holder 31. Further, when the base plate 31*b* is placed on the holder pedestal 41*s*, the initial abutment surface 49*p*, which is the bearing surface 41*n* of the holder pedestal 41*s*, and an initial abutment surface 39*p*, which is the lower surface 31*j* of the base plate 31*b*, abut on each other to bring about an initial positioning state in which a center of the display surface 11*d* of the first image forming element 11*a* is located at the same position as the optical axis AX toward the first lens 21*o* of the first optical member 2*a* or is lowered by a predetermined distance. That is, at the time of adjustment after the initial stage, the holder 31 can be moved in the upward +Y direction with respect to the barrel 41, and precise positioning in the Y direction can be performed by fine adjustment of a movement amount of the holder 31 in the +Y direction.

The base plate 31*b* of the holder 31 includes a thin portion 35*t* at an edge portion on the left, right and back sides. The thin portion 35*t* serves as a step S2 facing the step S1 of the holder pedestal 41*s*. As a result, a trench TR is formed by the step S1 provided at the holder pedestal 41*s* of the barrel cover 41*u* and the step S2 provided at the thin portion 35*t* of the holder 31. The trench TR is a part of an adhesive application portion AA, and has a role of holding the adhesive AM1 around the thin portion 35*t* of the base plate 31*b* to prevent unintended diffusion. That is, the steps S1 and S2 can be said to be diffusion prevention walls. When positioning the holder 31, which will be described later, the holder 31 is slightly displaced. With such displacement of the holder 31, an application state of the adhesive AM1 becomes coarse or dense, and at a dense position, the adhesive AM1 may protrude to a periphery of the holder 31 (that is, the upper surface 31*u*) or the adhesive AM1 may protrude outside the holder pedestal 41*s*, which may hinder subsequent adjustment or handling. In order to prevent this, the trench TR is provided so as to stop the adhesive AM1 in a necessary region.

The adhesive AM1 applied to the trench TR enters a gap G2 between the base plate 31*b* and the holder pedestal 41*s*. Accordingly, a part of the adhesive AM1 is interposed between the base plate 31*b* and the holder pedestal 41*s*. A thickness of the adhesive AM1 between the base plate 31*b* and the holder pedestal 41*s* is from 0 mm to 0.5 mm. A viscosity of the adhesive AM1 is about 10,000 MPa·s, and the adhesive AM1 easily enters the gap G2.

Referring to FIG. 9, an edge portion on the −Z side of the holder pedestal 41*s* formed at the barrel cover 41*u* is provided with two protrusions 49*s* protruding to the forward +Z side from a side surface of the step S1. The two protrusions 49*s* abut on two corresponding points 39*s* of the thin portion 35*t* formed at the edge portion on the −Z side of the base plate 31*b* of the holder 31. Initial abutment points 39*d*, which are corresponding point 39*s* at a rear end of the holder 31, and initial abutment points 49*d*, which are the two protrusions 49*s* of the holder pedestal 41*s* of the barrel cover 41*u*, abut on each other to bring about initial positioning state in which the holder 31 is positioned with respect to the barrel cover 41*u*. In this case, a distance from the display surface 11*d* of the first image forming element 11*a* to the first lens 21*o* of the first optical member 2*a* illustrated in FIG. 8 is slightly shorter than an original proper distance. That is, at the time of adjustment after the initial stage, the holder 31 can be moved in the +Z direction with respect to the barrel 41, and precise positioning in the Z direction can be performed by fine adjustment of a movement amount of the holder 31 in the +Z direction.

The protrusion 49*s* for the initial positioning is not limited to being provided at the edge portion on the −Z side of the holder pedestal 41*s*, and as illustrated in the region DR2 of FIG. 9, instead of or in addition to the protrusions 49*s*, a pair of protrusions 149*s* can be provided at the edge portion on any of the ±X sides of the holder pedestal 41*s*.

In order to allow a position of the base plate 31*b* of the holder 31 to be slightly moved in the X direction and the Z direction inside the insertion opening 41*z*, an outline of the insertion opening 41*z* in plan view is made larger by one size than an outline of the first image forming element 11*a* in plan view. That is, the insertion opening 41*z* has a size including an adjustment margin for allowing the support frame 31*a* to move in a normal direction of the display surface 11*d* of the first image forming element 11*a* and in a lateral direction perpendicular to the normal direction. Accordingly, the space ISa for housing the first image forming element 11*a* and the support frame 31*a* is configured to avoid interference with the first image forming element 11*a* and the like and allow minute movement of the first image forming element 11*a* and the like. As a result, in a front upper portion of the holder 31, that is, on the front +Z side of a joint between the base plate 31*b* and the support frame 31*a*, a state is created in which the gap G1 is formed. Therefore, at the time of applying the adhesive AM1 described above, the adhesive AM2 which is the adhesive material AM is applied so as to close the gap G1, and the adhesive AM2 is cured after positioning of the holder 31 which will be described later. The adhesive AM2 applied to an end portion of the base plate 31*b* enters the gap G1 between the base plate 31*b* and the holder pedestal 41*s* (see FIG. 8). Accordingly, a part of the adhesive AM2 is interposed between the base plate 31*b* and the holder pedestal 41*s*. For example, the adhesive AM2 enters up to a position of a broken line QZ illustrated in the region DR2 of FIG. 9.

A thickness of the adhesive AM2 between the base plate 31*b* and the holder pedestal 41*s* is from 0 mm to 0.5 mm. A viscosity of the adhesive AM2 is about 10,000 MPa·s similarly to the adhesive AM1, and the adhesive AM2 easily enters the gap G1. The adhesive AM2 is a photo-curable type adhesive similar to the adhesive AM1, and is, for example, an acrylic ultraviolet curable resin.

When the adhesive AM1 corresponding to the trench TR and the adhesive AM2 corresponding to the gap G1 are combined, a closed shape like four sides of a rectangle is obtained. A combination of both the adhesives AM1 and AM2 is called a dust-proof structure DP2 of the first image forming element 11*a*. The dust-proof structure DP2 achieves fixation between the holder 31 and the barrel 41 while ensuring dust-proofing between the holder 31 and the barrel 41. The adhesives AM1 and AM2 of the dust-proof structure DP2 extend along a periphery of the base plate 31*b* and protrude to the holder pedestal 41*s*. The dust-proof structure DP2 is an encapsulation member EM that is formed of a photocurable resin and maintains a state in which the holder 31 is positioned with respect to the barrel 41. The encapsulation member EM allows the first image forming element 11*a* to be easily positioned with high accuracy. The adhesives AM1 and AM2 are desirably materials that exhibit little curing shrinkage. Portions (the trench TR and the gap G1) to which the adhesives AM1 and AM2 constituting the dust-proof structure DP2 are applied are the adhesive application portions AA.

Note that as illustrated in the region DR2 of FIG. 9, a seal RK may be attached in advance to the upper surface of the barrel 41 so as to encapsulate the insertion opening 41*z*. By peeling off the seal RK immediately before the base plate 31*b* of the holder 31 is inserted into the insertion opening 41*z*, it is possible to reliably prevent dust and dirt from entering the barrel 41.

Figure 10:
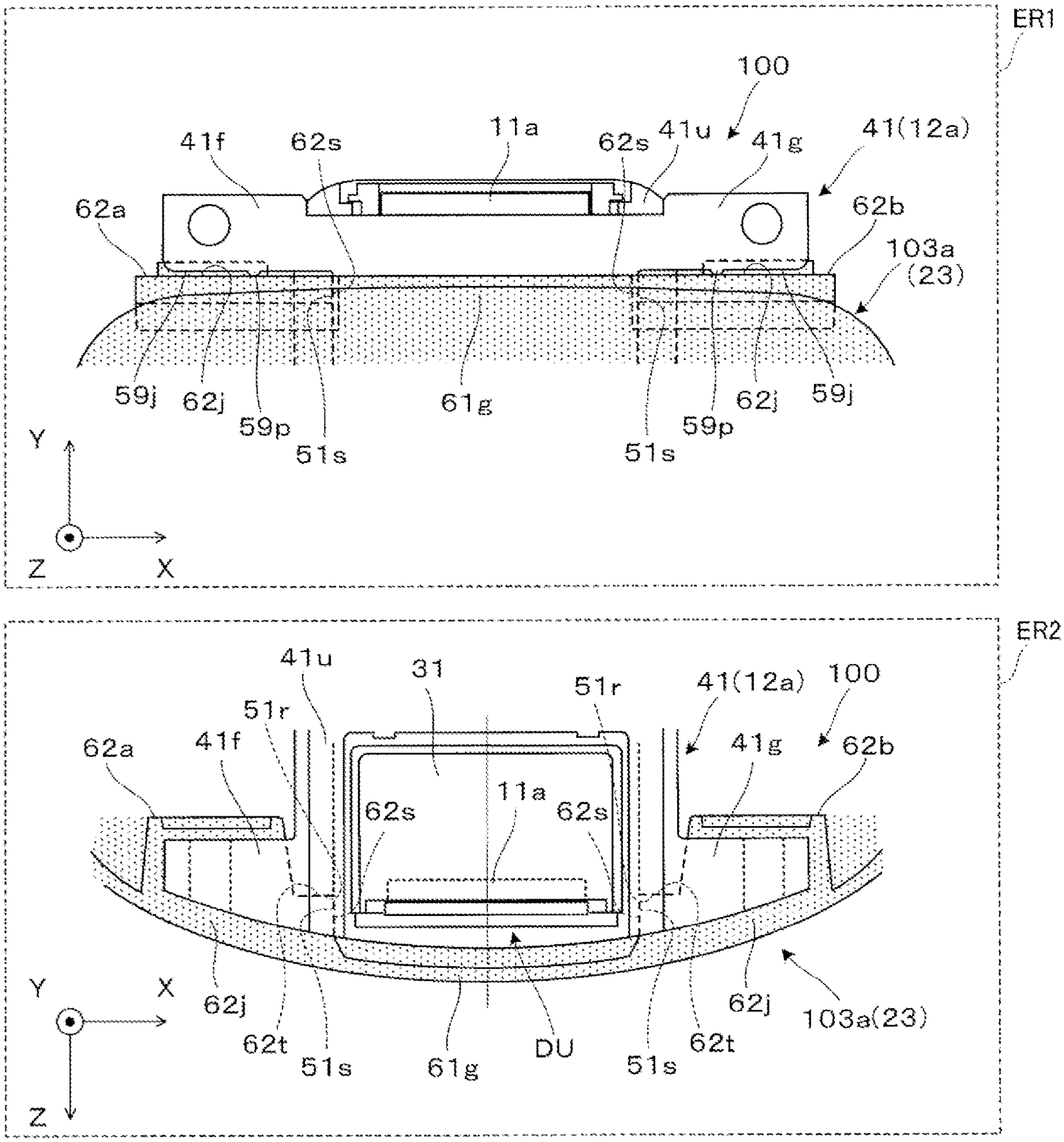
FIG. 10 illustrates a front view and a plan view of the optical module.

With reference to FIG. 10, fixing of the first combiner 103*a* to the barrel 41, that is, fixing of the see-through mirror 23 to the first projection optical system 12*a* will be described. In FIG. 10, a region ER1 is a front view of the barrel 41 and the first combiner 103*a*, and a region ER2 is a plan view of the barrel 41 and the first combiner 103*a*.

In the optical module 100, a pair of attachment portions 62*a* and 62*b* are formed at the upper end 61*g* of the first combiner 103*a* so as to protrude inward, that is, to the −Z side. A pair of facing inner surfaces 62*s* of the pair of attachment portions 62*a* and 62*b* are fitted to a pair of outward lateral side surfaces 51*s* of the barrel 41 so as to sandwich the pair of lateral side surfaces 51*s*. A pair of rear side surfaces 62*t* of the pair of attachment portions 62*a* and 62*b* abut on a pair of stepped front side surfaces 51*r* of the barrel 41. Further, a plurality of convex portions 59*p* protruding from a bottom surface 59*j* of the pair of protruding portions 41*f* and 41*g* abut on a pair of upper surfaces 62*j* of the pair of attachment portions 62*a* and 62*b*. As a result, three-dimensional positioning of the first combiner 103*a* becomes possible, and fixing of the first combiner 103*a* to the barrel 41 is completed by supplying an adhesive to an abutting point and a periphery thereof and curing the adhesive with an ultraviolet ray or the like.

The fixing of the first combiner 103*a* to the barrel 41 is performed before the holder 31 is fixed to the barrel 41. When the fixing of the holder 31 precedes the fixing of the first combiner 103*a*, the positioning of the holder 31 is performed with respect to the first projection optical system 12*a*.

Figure 11:
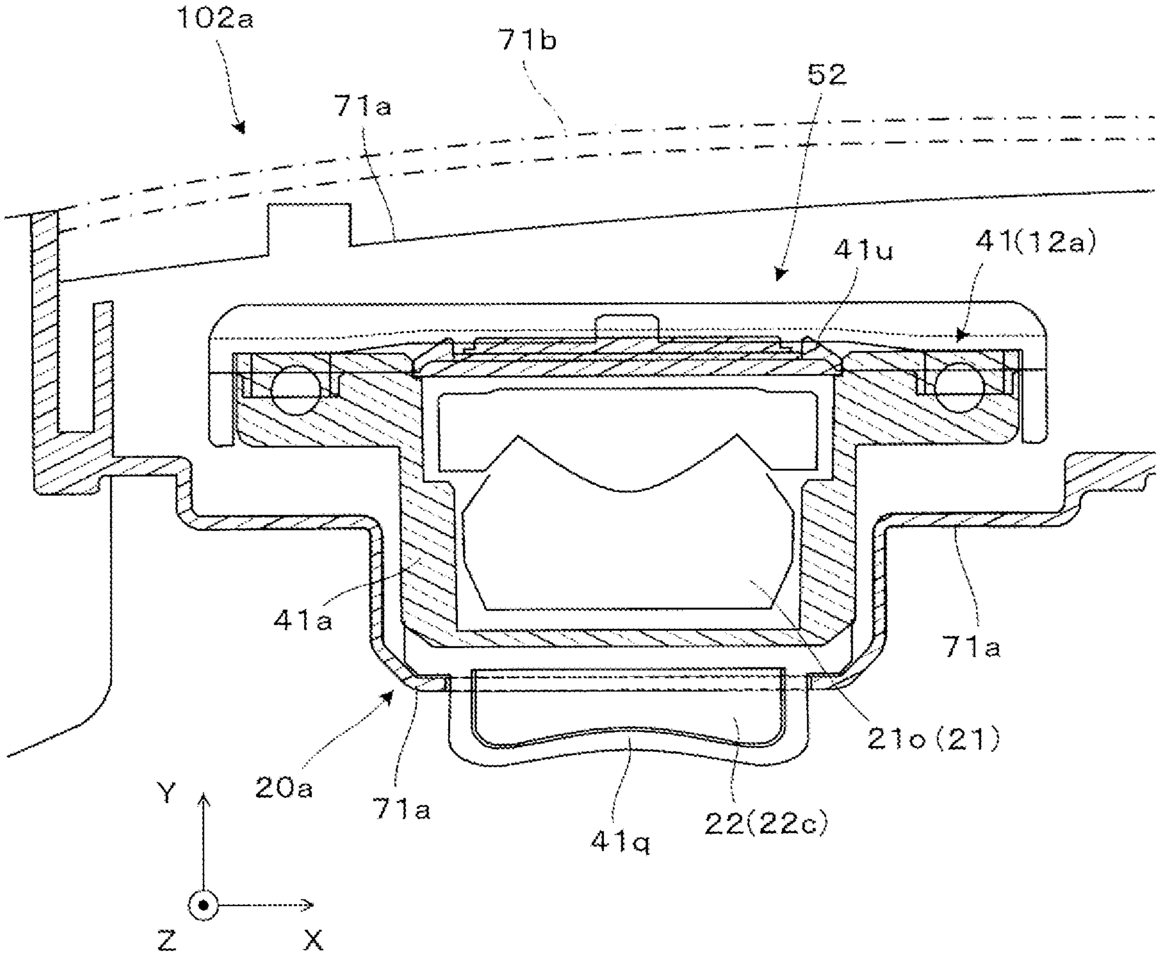
FIG. 11 is a conceptual view for explaining a front cross-sectional structure of the display device on the one side.

FIG. 11 is a front cross-sectional view of the first display driving unit 102*a* of the first display device 100A illustrated in FIG. 1. The barrel 41 is fixed to the frame 52. The frame 52 supports the first display section 20*a* including the barrel 41 and determines an arrangement thereof. A lower cover 71*a* is arranged so as to cover a lower side of the barrel 41. The lower cover 71*a* is supported by the frame 52 illustrated in FIG. 3, and is linked to the support device 100C illustrated in FIG. 1 at an end portion on a left side in the figure. An upper cover 71*b* is detachably attached to the lower cover 71*a*.

Figure 12:
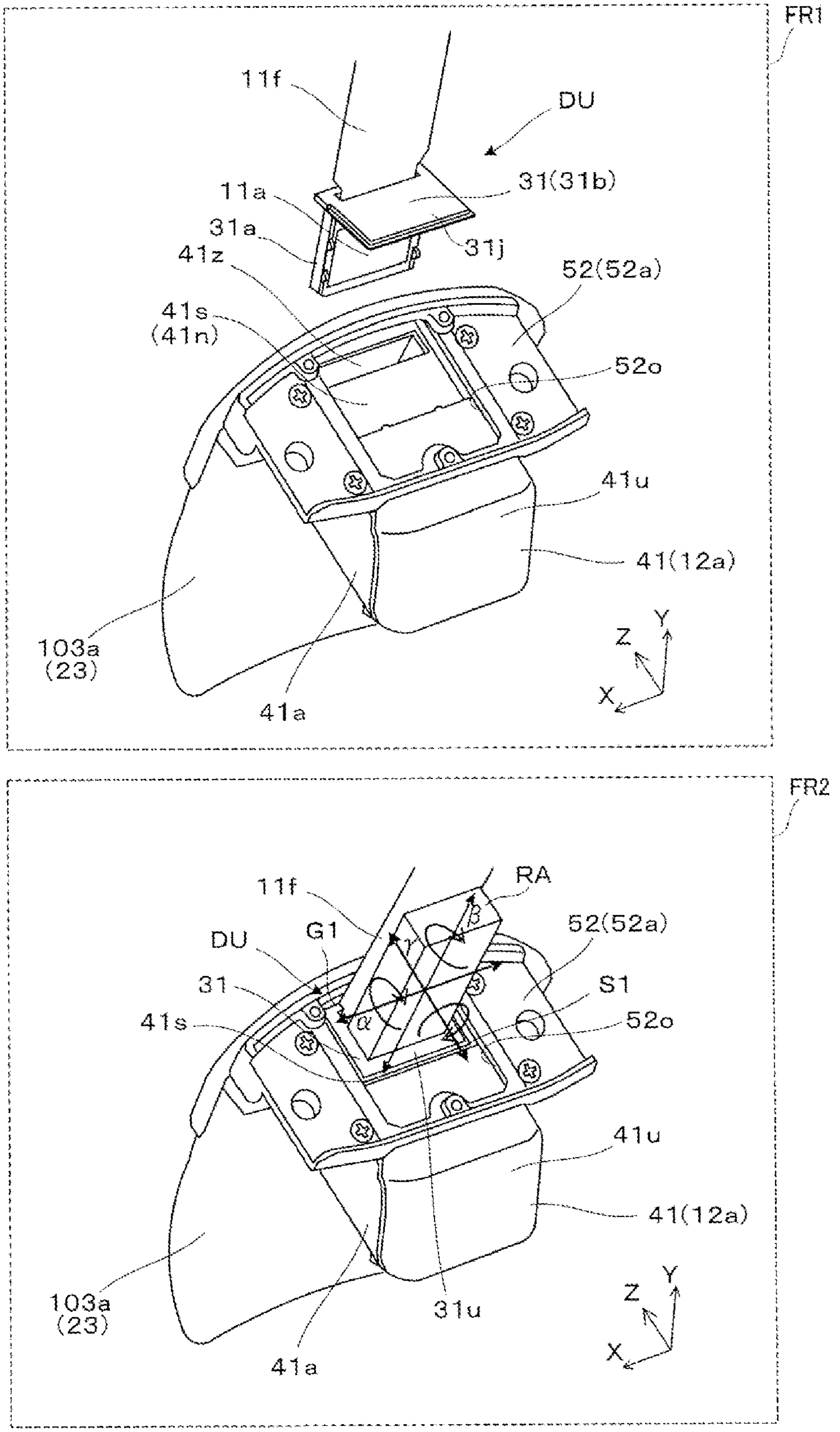
FIG. 12 illustrates perspective views for explaining assembly of the display unit to the barrel.

A method of assembling the display unit DU to the barrel 41, which is a manufacturing method of the optical module 100, will be described with reference to FIGS. 8, 9, 12 and the like. In FIG. 12, a region FR1 is a perspective view illustrating a state before the display unit DU is assembled to the barrel 41, and a region FR2 is a perspective view illustrating a state during the assembly of the display unit DU.

The barrel 41 incorporating the optical members 2*a* and 2*b* is prepared. First, the first lens 21*o*, the second lens 21*p*, the third lens 21*q*, and the prism mirror 22 are positioned to the barrel body 41*a* and fixed by adhesion. Thereafter, the barrel cover 41*u* is airtightly fixed to the barrel body 41*a* by adhesion. At this stage, the barrel 41 is in a sealed state except for the insertion opening 41*z*.

In the example illustrated in the region FR1 of FIG. 12, the first combiner 103*a* is fixed to a front portion of the barrel 41, and the portion 52*a* of the frame 52 is attached to an upper portion of the barrel 41. Next, the holder 31 of the display unit DU is inserted into the insertion opening 41*z* of the barrel 41 exposed to an opening 520 of the frame 52. To be specific, the support frame 31*a* of the holder 31 constituting the display unit DU is inserted into the insertion opening 41*z* together with the first image forming element 11*a*. At this time, the base plate 31*b* of the holder 31 is placed above the holder pedestal 41*s* of the barrel cover 41*u*. In this case, at an initial stage of attaching the holder 31 to the barrel 41, the insertion opening 41*z* is substantially closed, and it becomes easy to secure dust-proofing in the barrel 41. When the holder 31 is pressed in the backward −Z direction in this state, the two protrusions 49*s* provided at the barrel 41 and the two corresponding points 39*s* provided at the holder 31 abut on each other in a state in which the bearing surface 41*n* which is a front surface of the holder pedestal 41*s* provided at the barrel 41 and the lower surface 31*j* of the base plate 31*b* provided at the holder 31 abut on each other (see FIG. 9). As a result, the initial positioning is achieved.

Figure 13:
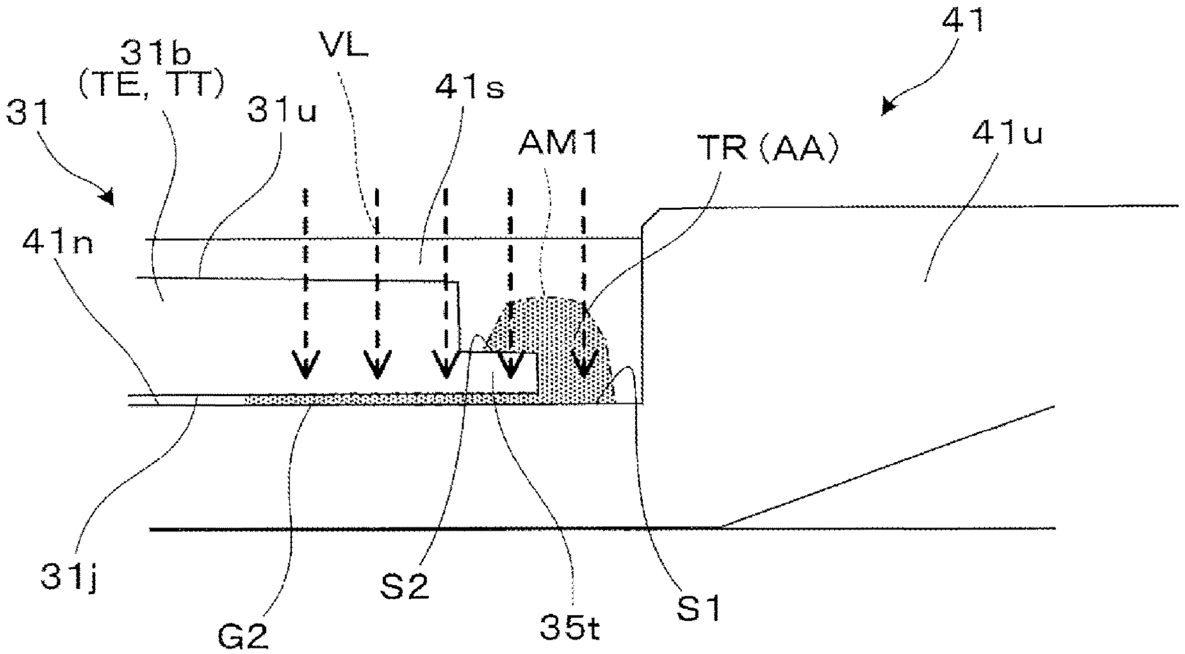
FIG. 13 is a conceptual view for explaining the assembly of the display unit to the barrel.

After the initial positioning, the adhesive AM1 is supplied to the step S1 provided at the edge portion on the three sides of the holder pedestal 41*s*, and the adhesive AM2 is supplied as an encapsulation portion so as to close the gap G1 remaining at the insertion opening 41*z* of the barrel cover 41*u* (see FIG. 8). Thereafter, the upper surface 31*u* of the base plate 31*b* of the holder 31 is suctioned by an arm RA of the three-dimensional driving device to support the holder 31. An image forming state is observed while posture of the holder 31 is adjusted with the six axes by the arm RA, and movement of the holder 31 or the display unit DU is stopped in a state in which aberration is reduced to such an extent that desired optical performance can be achieved. Note that as illustrated in the region FR2 of FIG. 12, the arm RA supports the upper surface 31*u* of the holder 31 by a suction mechanism and is capable of moving the holder 31 in directions of three axes α, β and γ and rotating the holder 31 about the three axes α, β and γ. At this time, the adhesives AM1 and AM2 are in a state of entering between the base plate 31*b* and the holder pedestal 41*s*. Thereafter, the adhesives AM1 and AM2 supplied to the step S1 and the like are irradiated with ultraviolet light to cure the adhesives AM1 and AM2. That is, the base plate 31*b* is fixed to the holder pedestal 41*s* provided in a vicinity of the insertion opening 41*z* of the barrel 41 by the adhesives AM1 and AM2. As illustrated in FIG. 13, a part of ultraviolet light VL is absorbed by the transparent portion TT or the transparent component TE of the base plate 31*b*, but the adhesives AM1 and AM2 entering between the base plate 31*b* and the holder pedestal 41*s* are cured by the remaining ultraviolet light VL transmitted through the base plate 31*b*. Even when the adhesives AM1 and AM2 enter from the insertion opening 41*z* of the holder pedestal 41*s*, the adhesives AM1 and AM2 are cured by the ultraviolet light VL transmitted through the transparent portion TT or the transparent component TE of the support frame 31*a*.

In the above description, the process of supplying the adhesive AM1 to the step S1 of the holder pedestal 41*s* and supplying the adhesive AM2 so as to close the gap G1 remaining at the insertion opening 41*z* may be performed before the process of inserting the display unit DU into the barrel 41.

In the process of adjusting the posture of the holder 31, the inside of the barrel 41 is sealed by the adhesives AM1 and AM2, and the first image forming element 11*a* can be assembled to the optical module 100 in consideration of dust-proofing.

Returning to FIG. 12, in the above description, the direction in which the holder 31 is moved by the arm RA is mainly the γ direction parallel to the optical axis AX. Therefore, the base plate 31*b* moves mainly in a direction of the lower surface 31*j* thereof, so that it is easy to secure a space for positioning, and it is easy to downsize the barrel 41 and the optical module 100.

By performing the initial positioning of the holder 31, it is possible to reduce a burden when the posture is adjusted with the six axes. In addition, by performing the initial positioning, it is possible to omit adjustment of movement or rotation with respect to an axis having a low influence degree. That is, it is possible to perform simple posture adjustment by reducing the number of adjustment axes from the posture adjustment with the six axes. To be more specific, the adjustment of the rotation around the β-axis or the Y-axis can be omitted by the initial positioning using the two protrusions 49*s* provided at the barrel 41.

The head-mounted display apparatus of the first embodiment described above, that is, the HMD 200 includes the holder 31 including the image forming element 11*a*, the supporting member MM1 supporting the image forming element 11*a*, and the fixing member MM2 coupled to the supporting member MM1, the optical members 2*a* and 2*b* on which the image light ML from the image forming element 11*a* is incident, and the case CA for housing the optical members 2*a* and 2*b*, and holding the image forming element 11*a* therein via the holder 31, wherein the holder 31 includes the transparent portion TT, the fixing member MM2 is fixed to the outside of the case CA by the adhesive material AM, and the adhesive material AM is interposed between the transparent portion TT and the case CA.

In the above-described HMD 200, the holder 31 is bonded and fixed from the outside of the case CA, thus, it is possible to enhance dust resistance while suppressing an increase in size of the apparatus. The adhesive material AM interposed between the transparent portion TT of the holder 31 and the case CA is prevented from being uncured. As a result, it is possible to prevent the uncured adhesive material AM from flowing to the image forming element 11*a* side, and to improve display quality and reliability of the image forming element 11*a*. By increasing an adhesion area between the holder 31 and the case CA, adhesion strength is improved, and robustness of the apparatus is enhanced.

In the HMD 200 described above, the end portion of the support frame 31*a* provided at the holder 31 is inserted into the barrel 41 through the insertion opening 41*z* formed at the barrel 41, and the base plate 31*b* is fixed to the barrel 41 while covering the insertion opening 41*z*, thus at the initial stage of attaching the holder 31 to the barrel 41, the insertion opening 41*z* is closed, and a time during which the first projection optical system 12*a* and the first image forming element 11*a* supported by the support frame 31*a* in the barrel 41 are exposed to an external environment can be shortened, and thus dust-proofing can be easily ensured. In addition, since the first image forming element 11*a* is housed in the barrel 41 at the initial stage of attachment, a phenomenon in which the first image forming element 11*a* is displaced by an external load does not occur after the arrangement of the first image forming element 11*a* is adjusted.

When the adhesive material AM is applied to a boundary between the base plate 31*b* and the holder pedestal 41*s*, the adhesive material AM enters between the base plate 31*b* and the holder pedestal 41*s*. This entrance of the adhesive material AM is promoted when the base plate 31*b* is held and adjusted in position. The gaps G1 and G2 between the base plate 31*b* and the holder pedestal 4*s* are in a shadow of the base plate 31*b*. Therefore, when a photo-curable resin is used as the adhesive material AM, light is blocked and the adhesive material AM is not cured. The uncured adhesive material AM may drop from a planar portion of the holder pedestal 41*s* to the first image forming element 11*a*. That is, there is a possibility that the adhesive material AM flows into the insertion opening 41*z* of the barrel 41 and flows to the first image forming element 11*a*. The uncured adhesive material AM that has entered is reflected in an image region or an outside of the image region, thereby causing deterioration in image quality. In the embodiment, the adhesive material AM is cured while being prevented from being uncured by light irradiation through the transparent portion TT, and the barrel 41 is reliably bonded and sealed. This prevents the optical members 2*a* and 2*b* from being affected by irregular reflection or the like.

Second Embodiment

An HMD of a second embodiment will be described below. Note that the HMD of the second embodiment is obtained by modifying a part of the HMD of the first embodiment, and description of common parts to the HMD of the first embodiment will be omitted.

Figure 14:
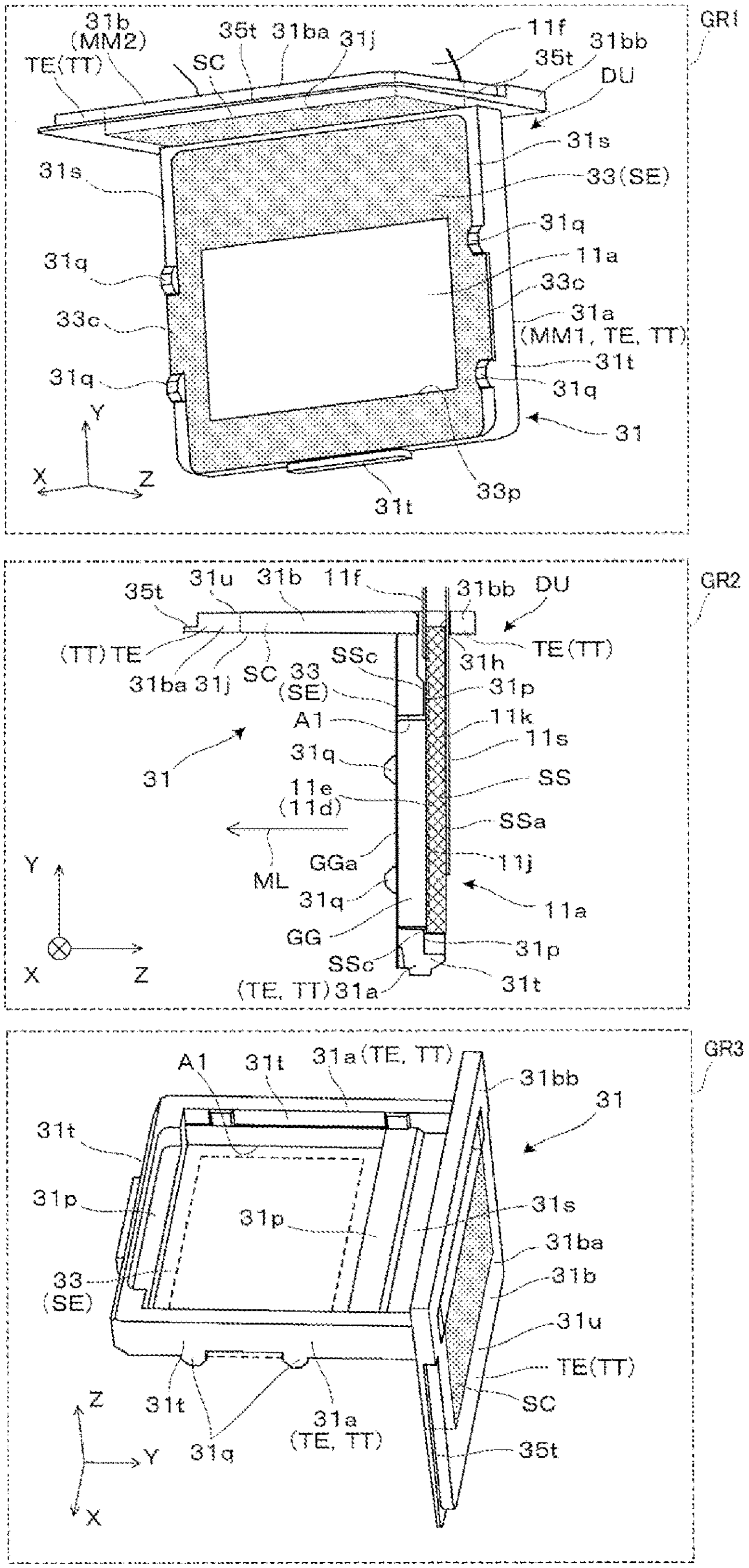
FIG. 14 illustrates diagrams for explaining a display unit of a head-mounted display apparatus of a second embodiment.

FIG. 14 illustrates diagrams for explaining the display unit DU in which the first image forming element 11*a* is assembled to the holder 31. In FIG. 14, a region GR1 is a perspective view illustrating a front side of the display unit DU, a region GR2 is a side cross section of the display unit DU, and a region GR3 is a perspective view illustrating a back side of the holder 31.

As illustrated in FIG. 14, the base plate 31*b* includes a light shielding component SC, and the transparent component TE provided outside the light shielding component SC. That is, the base plate 31*b* includes the transparent component TE at an outer periphery thereof. Accordingly, it is possible to prevent the adhesive material AM from being uncured while securing a light shielding property and an adhesion area.

The light shielding component SC is a member formed of a resin having a light shielding property, and the light shielding component SC has a rectangular outer shape extending from one long side of the insertion opening 41*z*. The transparent component TE is an optical transparent member similar to that of the first embodiment, and has a frame-like outer shape surrounding an outside of the light shielding component SC. That is, the transparent portion TT or the transparent component TE is disposed so as to surround three sides of the light shielding component SC and another long side of the hole 31*h*.

A proportion of the transparent component TE or the transparent portion TT in the base plate 31*b* depends on how the adhesive material AM enters between the base plate 31*b* and the holder pedestal 41*s*. It is sufficient that the transparent portion TT is disposed in a range in which the adhesive material AM interposed between the base plate 31*b* and the holder pedestal 41*s* can be irradiated with light. In the embodiment, ultraviolet light is incident from an upper portion of the transparent component TE, passes through the transparent component TE, and cures the adhesive material AM.

In the base plate 31*b*, the light shielding component SC and the transparent component TE may be separate members, or may be integrally formed. In a case of an integral formation, for example, two color molding is performed such that the transparent member is partially included.

Third Embodiment

An HMD of a third embodiment will be described below. Note that the HMD of the third embodiment is obtained by modifying a part of the HMD of the first embodiment, and description of common parts to the HMD of the first embodiment will be omitted.

Figure 15:
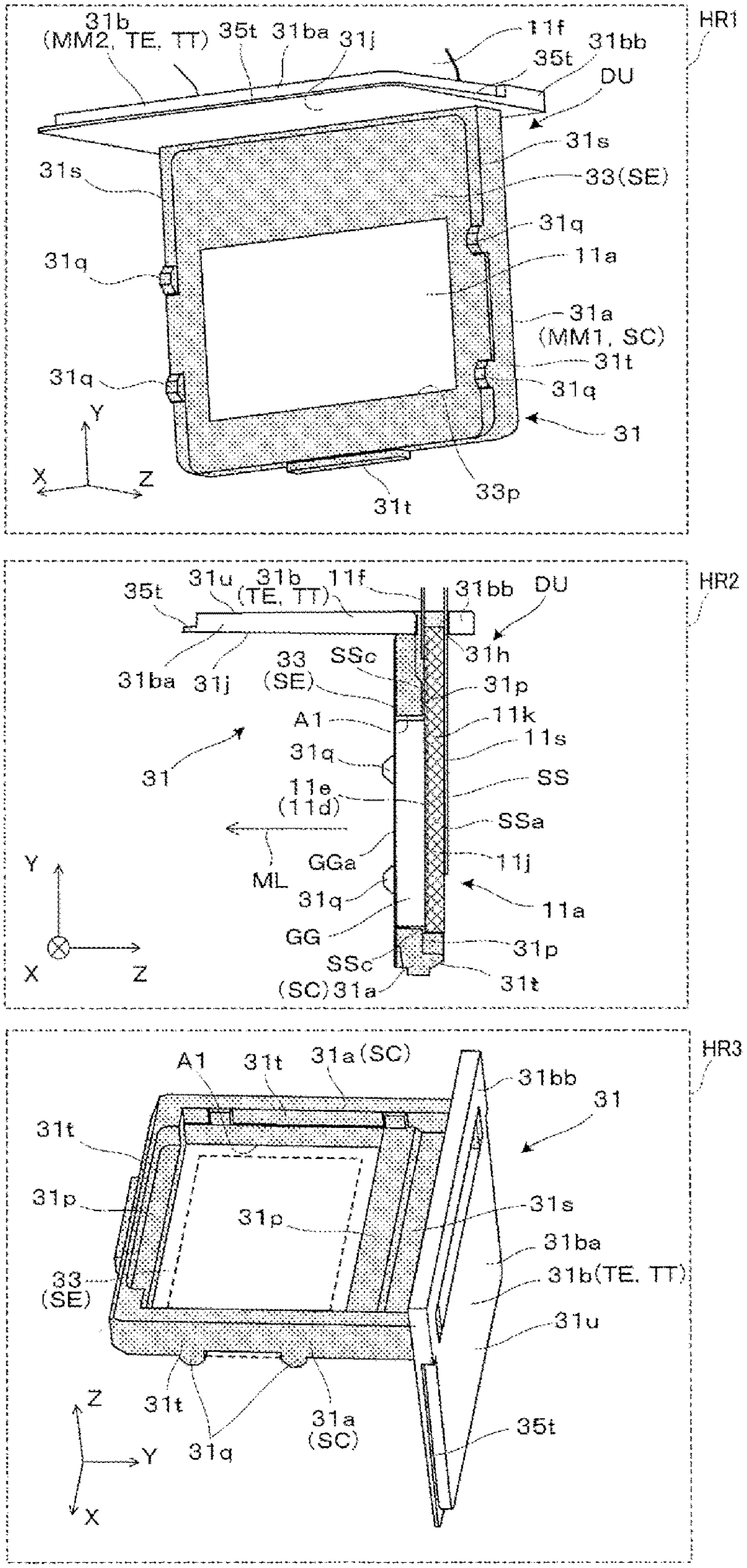
FIG. 15 illustrates diagrams for explaining a display unit of a head-mounted display apparatus of a third embodiment.

FIG. 15 illustrates diagrams for explaining the display unit DU in which the first image forming element 11*a* is assembled to the holder 31. In FIG. 15, a region HR1 is a perspective view illustrating a front side of the display unit DU, a region HR2 is a side cross section of the display unit DU, and a region HR3 is a perspective view illustrating a back side of the holder 31.

As illustrated in FIG. 15, in the holder 31, the support frame 31*a* includes the light shielding component SC. That is, in the embodiment, the support frame 31*a* does not include the transparent component TE. This prevents a light beam emitted from the first image forming element 11*a* from being reflected, transmitted, diffused, or the like by the support frame 31*a*. Note that the light shielding plate 33 (light shielding member SE) can be omitted.

Note that in the optical module 100 of the embodiment, a part of the base plate 31*b* may be used as the light shielding component SC as in the second embodiment.

Fourth Embodiment

An HMD of a fourth embodiment will be described below. Note that the HMD of the fourth embodiment is obtained by modifying a part of the HMD of the first embodiment, and description of common parts to the HMD of the first embodiment will be omitted.

Figure 16:
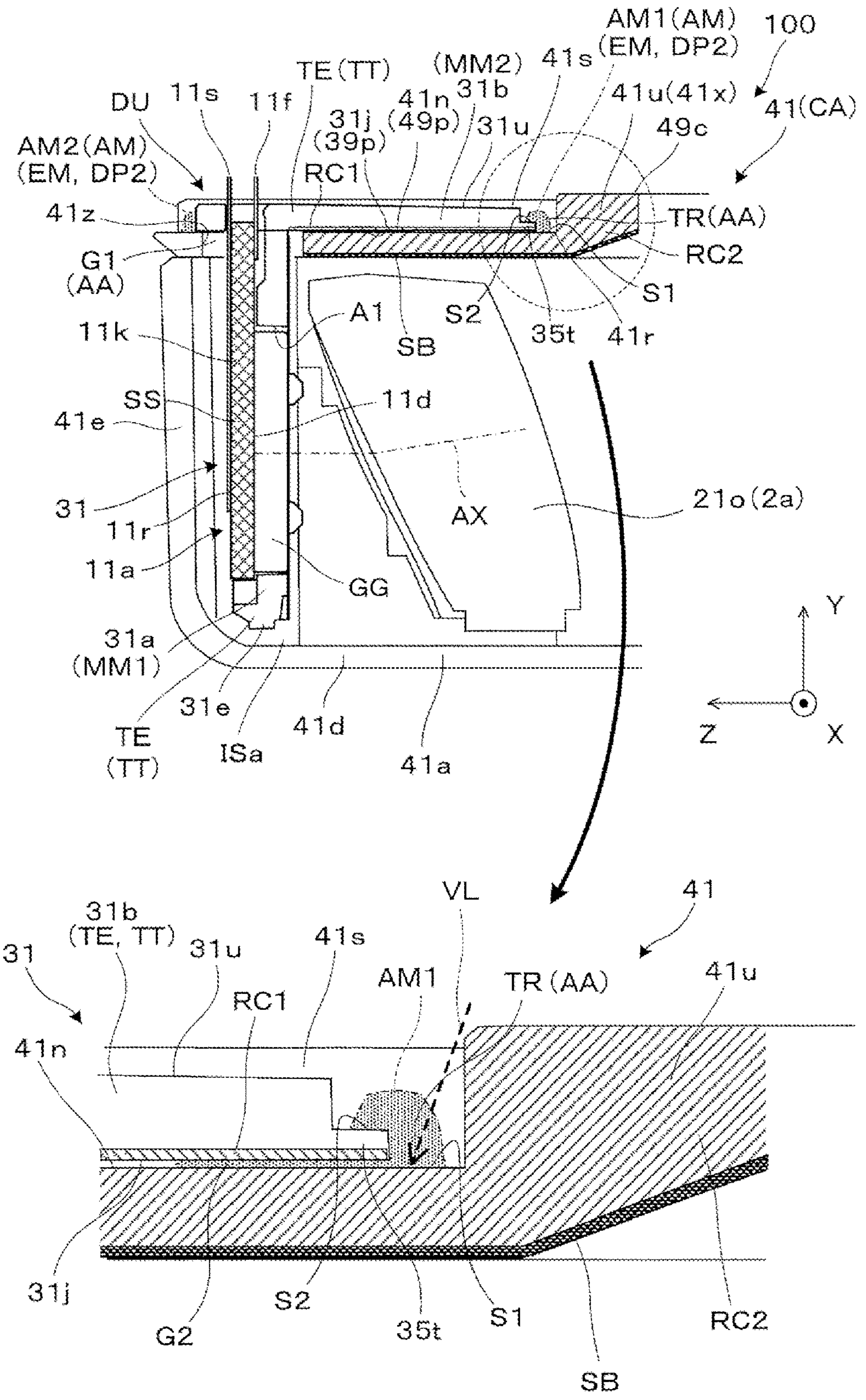
FIG. 16 illustrates diagrams for explaining a head-mounted display apparatus of a fourth embodiment.

FIG. 16 illustrates enlarged cross-sectional views for explaining a main part of the optical module 100. As illustrated in FIG. 16, in the holder 31, the base plate 31*b* includes a first reflective component RC1 on the holder pedestal 41*s* side. In addition, in the barrel 41 or the case CA, the holder pedestal 41*s* includes a second reflective component RC2 on the base plate 31*b* side. Accordingly, it is possible to prevent the adhesive material AM interposed between the first reflective component RC1 and the second reflective component RC2 from being uncured.

Figure 17:
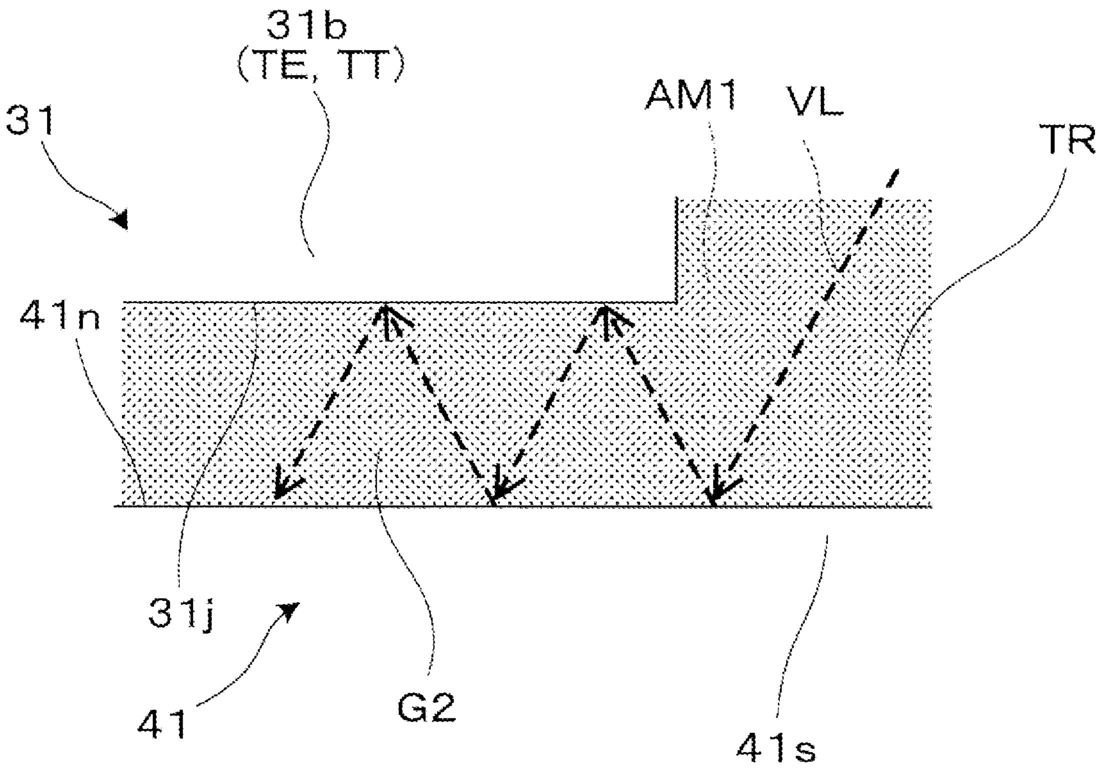
FIG. 17 is a diagram illustrating an irradiation state of ultraviolet light when the display unit is assembled to the barrel.

As the reflective components RC1 and RC2, a metallic material, a white resin, a resin member on which a reflective film is deposited, a sheet on which a reflective film is deposited, a multilayer film, a white resin film, or the like is used. When the reflective film is deposited, the reflective film is provided at a surface of a resin material or a sheet to be a base material, and the base material and the reflective film are separate bodies. The reflective film is a tape, a dielectric multilayer film, or the like. As illustrated in FIG. 17, the ultraviolet light VL or an ultraviolet ray radiated from obliquely above the base plate 31*b* is incident on the adhesive material AM in the gap G2 between the base plate 31*b* and the holder pedestal 41*s* from the adhesive material AM exposed in the trench TR. The ultraviolet light VL or the ultraviolet ray is reflected by the lower surface 31*j* of the base plate 31*b* and the bearing surface 41*n* of the holder pedestal 41*s*, and reaches the adhesive material AM that has entered the gap G2, thereby curing the adhesive material AM.

The second reflective component RC2 includes a light shielding member SB at a surface opposite to a surface facing the base plate 31*b*. The light shielding member SB is subjected to processing such as black coating or black tape attachment, for example. Note that an inside of the second reflective component RC2 may be painted in black. This prevents reflection, diffusion, and the like of light at the barrel 41, thus light does not enter the optical members 2*a* and 2*b*.

Note that in the base plate 31*b*, the first reflective component RC1 on the holder pedestal 41*s* side may be omitted.

Fifth Embodiment

An HMD of a fifth embodiment will be described below. Note that the HMD of the fifth embodiment is obtained by modifying a part of the HMD of the first embodiment, and description of common parts to the HMD of the first embodiment will be omitted.

Figure 18:
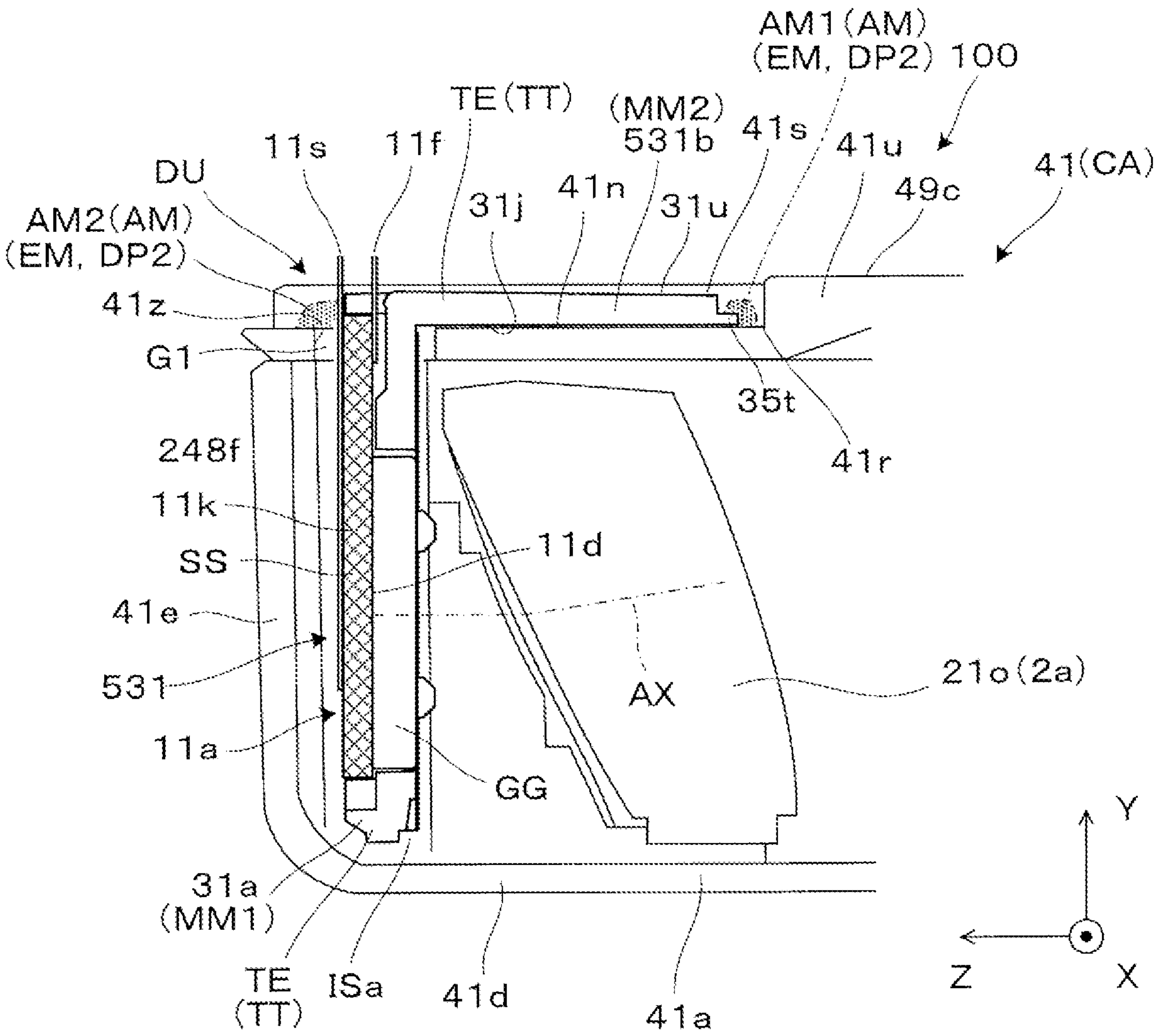
FIG. 18 is a diagram for explaining a head-mounted display apparatus of a fifth embodiment.

FIG. 18 is an enlarged cross-sectional view for explaining a main part of the optical module 100. As illustrated in FIG. 18, a holder 531 is a member formed of, for example, a resin having optical transparency, and has an outer shape bent in an L-shape in side view. The holder 531 includes the support frame 31*a* that supports the first image forming element 11*a*, and a base plate 531*b* that is coupled to the upper portion of the support frame 31*a* and extends in a direction intersecting or orthogonal to the support frame 31*a*. The base plate 531*b* does not protrude to an end portion on the +Z side of the holder pedestal 41*s*.

In the embodiment, in a front upper portion of the holder 31, that is, on the front +Z side of a joint between the base plate 31*b* and the support frame 31*a*, a state is created in which the insertion opening 41*z* is partially opened to form the gap G1. Thus, after the holder 31 is positioned and fixed to the barrel 41, the adhesive AM2 as the encapsulation portion is applied to a space between a front end of the insertion opening 41*z* and the silicon substrate SS of the first image forming element 11*a* or the heat dissipation sheet 11*s* so as to fill the space, so as to cover the gap G1, and the adhesive AM2 is cured after the holder 31 is positioned.

Modification Examples and Others

Although the present disclosure has been described with reference to the above-described embodiments, the present disclosure is not limited to the above-described embodiments and can be implemented in various modes without departing from the spirit of the disclosure. For example, the following modifications are possible.

Although the HMD 200 includes the first display device 100A and the second display device 100B in the above description, the HMD 200 may be configured such that the single first display device 100A or second display device 100B is supported in front of the eye by the support device 100C.

In the above description, with respect to the holder 31, the support frame 31*a* and the base plate 31*b* extend in the directions orthogonal to each other, however, the support frame 31*a* and the base plate 31*b* are not limited to being orthogonal to each other, and may be bent to extend in directions intersecting with each other.

The support frame 31*a* is not limited to one inserted from above, but may be one inserted from a side.

The size of the base plate 31*b* is about the same as that of the support frame 31*a*, but may be about half or less of the size of the support frame 31*a*.

The shape of the base plate 31*b* is not limited to a rectangle, but may be various shapes such as a circle, an ellipse, and a polygon.

The steps S1 and S2 can be replaced with other structure that can limit movement of the adhesives AM1 and AM2, and can be replaced with, for example, a ridge.

The optical members 2*a* and 2*b* of the first projection optical system 12*a* are not limited to those illustrated in the figures, and for example, the number of the optical elements constituting the first optical member 2*a* and the shape of the optical surface can be appropriately changed in accordance with the purpose of use of the HMD 200 and the like.

In the holder 31, the support frame 31*a* and the base plate 31*b* are separate members, but may be integrated as a composite member.

The vertical light guide optical system has been exemplified, but the optical module 100 may be applied to a horizontal light guide optical system.

A head-mounted display apparatus in a specific aspect includes an image forming element, a holder including a supporting member supporting the image forming element and a fixing member coupled to the supporting member, an optical member on which image light from the image forming element is incident, and a case configured to house the optical member and hold the image forming element therein via the holder, wherein the holder includes a transparent portion, the fixing member is fixed to an outside of the case by an adhesive material, and the adhesive material is interposed between the transparent portion and the case.

In the above-described head-mounted display apparatus, the holder is bonded and fixed from an outside of the case, thus, it is possible to enhance dust resistance while suppressing an increase in size of the apparatus. The adhesive material interposed between the transparent portion of the holder and the case is prevented from being uncured. As a result, it is possible to prevent the uncured adhesive material from flowing to the image forming element side, and to improve display quality and reliability of the image forming element. By increasing an adhesion area between the holder and the case, adhesion strength is improved, and robustness of the apparatus is enhanced.

In the head-mounted display apparatus in a specific aspect, the supporting member is a support frame, the fixing member is a base plate coupled to an upper portion of the support frame and extending in a direction intersecting the support frame, an end portion of the support frame is inserted into the case through an insertion opening formed at the case, and the base plate is fixed to the case in a state of covering the insertion opening. In this case, since the insertion opening is closed at an initial stage of attaching the holder to the case, and a time during which the optical member and the image forming element in the case are exposed to an external environment can be made short, and dust-proofing can be easily ensured.

In the head-mounted display apparatus in a specific aspect, the case includes a holder pedestal facing the fixing member, and includes an encapsulation member that maintains a state in which the holder is positioned with respect to the case by the adhesive material extending along a periphery of the fixing member and protruding to the holder pedestal. In this case, the encapsulation member allows the image forming element to be easily positioned with high accuracy.

In the head-mounted display apparatus in a specific aspect, the adhesive material is formed of a photo-curable type adhesive.

In the head-mounted display apparatus in a specific aspect, the supporting member and the fixing member are separate members. In this case, it is possible to facilitate manufacturing and assembly of a member including the transparent portion out of the supporting member and the fixing member.

In the head-mounted display apparatus in a specific aspect, the fixing member as a whole includes the transparent portion. In this case, it is possible to prevent the adhesive material from being uncured in the entire fixing member.

In the head-mounted display apparatus in a specific aspect, the fixing member includes the transparent portion at an outer periphery thereof. In this case, it is possible to prevent the adhesive material from being uncured while securing a light shielding property and an adhesion area.

In the head-mounted display apparatus in a specific aspect, the supporting member includes the transparent portion and a light shielding member. In this case, the transparent portion can prevent the adhesive material entering the case from being uncured. The light shielding member can prevent image deterioration caused by reflection, transmission, and diffusion of a light beam emitted from the image forming element at the transparent portion.

In the head-mounted display apparatus in a specific aspect, the supporting member includes a light shielding component. In this case, reflection and diffusion of light can be prevented.

In the head-mounted display apparatus in a specific aspect, the fixing member includes a first reflective component on the holder pedestal side, and the holder pedestal includes a second reflective component on the fixing member side. In this case, it is possible to prevent the adhesive material interposed between the first reflective component and the second reflective component from being uncured.

In the head-mounted display apparatus in a specific aspect, the second reflective component includes the light shielding member at a surface on an opposite side of a surface facing the fixing member. In this case, reflection and diffusion of light can be prevented.

In the head-mounted display apparatus in a specific aspect, the case includes a container-shaped main body including a bottom plate member and a side wall, and a cover provided with an insertion opening and configured to cover an inside of the main body to form a housing space, the optical member includes a first optical member arranged on a light emission side of the image forming element, and a second optical member arranged on a light emission side of the first optical member and configured to bend an optical path by a reflection surface, an emission surface of the second optical member is exposed to an emission opening formed at the bottom plate member of the main body, and the case includes a sealing member that seals a coupling portion between the main body and the cover, and seals a gap between the emission opening of the main body and a periphery of the emission surface of the second optical member. In this case, the coupling portion and the emission opening can be protected from dust by the sealing member.

An optical module in a specific aspect includes an image forming element, a holder including a supporting member supporting the image forming element and a fixing member coupled to the supporting member, an optical member on which image light from the image forming element is incident, and a case configured to house the optical member and hold the image forming element therein via the holder, wherein the holder includes a transparent portion, the fixing member is fixed to an outside of the case by an adhesive material, and the adhesive material is interposed between the transparent portion and the case.

In the above-described optical module, the holder is bonded and fixed from an outside of the case, thus, it is possible to enhance dust resistance while suppressing an increase in size of the apparatus. The transparent portion of the holder makes it possible to prevent the uncured adhesive material from flowing to the image forming element side, and to improve display quality and reliability of the image forming element. By increasing the adhesion area between the holder and the case, the adhesion strength is improved, and the robustness of the apparatus is enhanced.

What is claimed is:

1. A head-mounted display apparatus, comprising:
- an image forming element;
- a holder including a supporting member supporting the image forming element, and a fixing member coupled to the supporting member;
- an optical member on which image light from the image forming element is incident; and
- a case configured to house the optical member and hold the image forming element therein via the holder, wherein
- the holder includes a transparent portion,
- the fixing member is fixed to an outside of the case by an adhesive material, and
- the adhesive material is interposed between the transparent portion and the case.

2. The head-mounted display apparatus according to claim 1, wherein
- the supporting member is a support frame,
- the fixing member is a base plate coupled to an upper portion of the support frame and extending in a direction intersecting the support frame,
- an end portion of the support frame is inserted into the case through an insertion opening formed at the case, and
- the base plate is fixed to the case in a state of covering the insertion opening.

3. The head-mounted display apparatus according to claim 1, wherein
- the case includes a holder pedestal facing the fixing member, and
- includes an encapsulation member that maintains a state in which the holder is positioned with respect to the case by the adhesive material extending along a periphery of the fixing member and protruding to the holder pedestal.

4. The head-mounted display apparatus according to claim 3, wherein
- the fixing member includes a first reflective component on a holder pedestal side, and
- the holder pedestal includes a second reflective component on a fixing member side.

5. The head-mounted display apparatus according to claim 4, wherein
- the second reflective component includes a light shielding member at a surface on an opposite side of a surface facing the fixing member.

6. The head-mounted display apparatus according to claim 1, wherein
- the adhesive material is formed of a photo-curable type adhesive.

7. The head-mounted display apparatus according to claim 1, wherein
- the supporting member and the fixing member are separate members.

8. The head-mounted display apparatus according to claim 1, wherein
- the fixing member as a whole includes the transparent portion.

9. The head-mounted display apparatus according to claim 8, wherein
- the supporting member includes the transparent portion and a light shielding member.

10. The head-mounted display apparatus according to claim 8, wherein
- the supporting member includes a light shielding component.

11. The head-mounted display apparatus according to claim 1, wherein
- the fixing member includes the transparent portion at an outer periphery thereof.

12. The head-mounted display apparatus according to claim 1, wherein
- the case includes a container-shaped main body including a bottom plate member and a side wall, and a cover provided with the insertion opening and configured to cover an inside of the main body to form a housing space,
- the optical member includes a first optical member arranged on a light emission side of the image forming element, and a second optical member arranged on a light emission side of the first optical member and configured to bend an optical path by a reflection surface,
- an emission surface of the second optical member is exposed to an emission opening formed at the bottom plate member of the main body, and
- the case includes a sealing member that seals a coupling portion between the main body and the cover, and seals a gap between the emission opening of the main body and a periphery of the emission surface of the second optical member.

13. An optical module, comprising:
- an image forming element;
- a holder including a supporting member supporting the image forming element, and a fixing member coupled to the supporting member;
- an optical member on which image light from the image forming element is incident; and
- a case configured to house the optical member and hold the image forming element therein via the holder, wherein
- the holder includes a transparent portion, the fixing member is fixed to an outside of the case by an adhesive material, and the adhesive material is interposed between the transparent portion and the case.

* * * * *